United States Patent [19]

Miyazawa et al.

[11] Patent Number: 5,752,089
[45] Date of Patent: May 12, 1998

[54] SYSTEM OPERABLE WITH A GIVEN APPARATUS AND CAPABLE OF PSEUDO-REWRITING A PROGRAM

[75] Inventors: Azuma Miyazawa, Mitaka; Satoshi Miyazaki, Tokyo; Tetsuo Miyasaka, Tsukui-machi; Toshiaki Ishimaru, Hino; Kazutada Kobayashi; Shoji Kawamura, both of Hachioji, all of Japan

[73] Assignee: Olympus Optical Co., Ltd., Tokyo, Japan

[21] Appl. No.: 238,985

[22] Filed: May 6, 1994

Related U.S. Application Data

[63] Continuation of Ser. No. 742,606, Aug. 8, 1991, abandoned.

[30] Foreign Application Priority Data

Aug. 13, 1990 [JP] Japan .................................. 2-214087
May 20, 1991 [JP] Japan .................................. 3-115070

[51] Int. Cl.⁶ .................................................. G03B 17/00
[52] U.S. Cl. ........................ 396/48; 396/211; 396/300; 396/321
[58] Field of Search .............................. 396/48, 211, 297, 396/300, 321

[56] References Cited

U.S. PATENT DOCUMENTS

| | | | |
|---|---|---|---|
| 4,488,798 | 12/1984 | Iida et al. | 354/402 |
| 4,560,267 | 12/1985 | Nakai et al. | 354/412 |
| 4,853,733 | 8/1989 | Watanabe et al. | 354/412 |
| 4,916,474 | 4/1990 | Miyazawa et al. | 354/412 |
| 5,040,016 | 8/1991 | Ishikawa et al. | 354/412 |
| 5,408,672 | 4/1995 | Miyazawa et al. | 395/800 |
| 5,502,830 | 3/1996 | Aihara | 354/289.12 |

FOREIGN PATENT DOCUMENTS

| | | |
|---|---|---|
| 63-163439 | 7/1988 | Japan . |
| 2-941 | 8/1988 | Japan . |
| 63-212923 | 9/1988 | Japan . |

Primary Examiner—Russell E. Adams
Attorney, Agent, or Firm—Frishauf, Holtz, Goodman, Langer & Chick

[57] ABSTRACT

The camera system comprises a camera and an external device. The camera includes a microcomputer, a write control circuit for receiving replacement data from the external device and writing the replacement data into a replacement program memory of the microcomputer, and an interface circuit for controlling a camera element in accordance with the decoded value output from an instruction decoder (ID) of the microcomputer. The external device includes a memory for storing address data to be changed in the microcomputer in the camera and replacement program data, and a transmission circuit for reading out the replacement data from the memory and transmitting the read-out data to the camera.

49 Claims, 29 Drawing Sheets

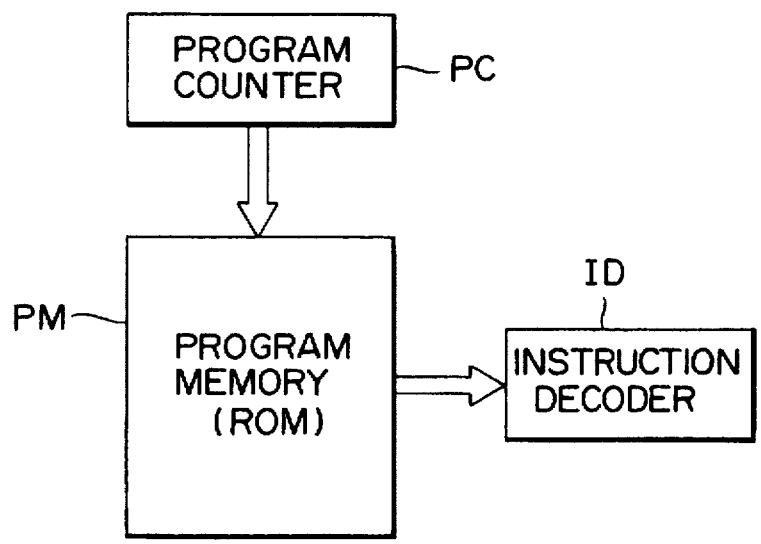
F I G. 1
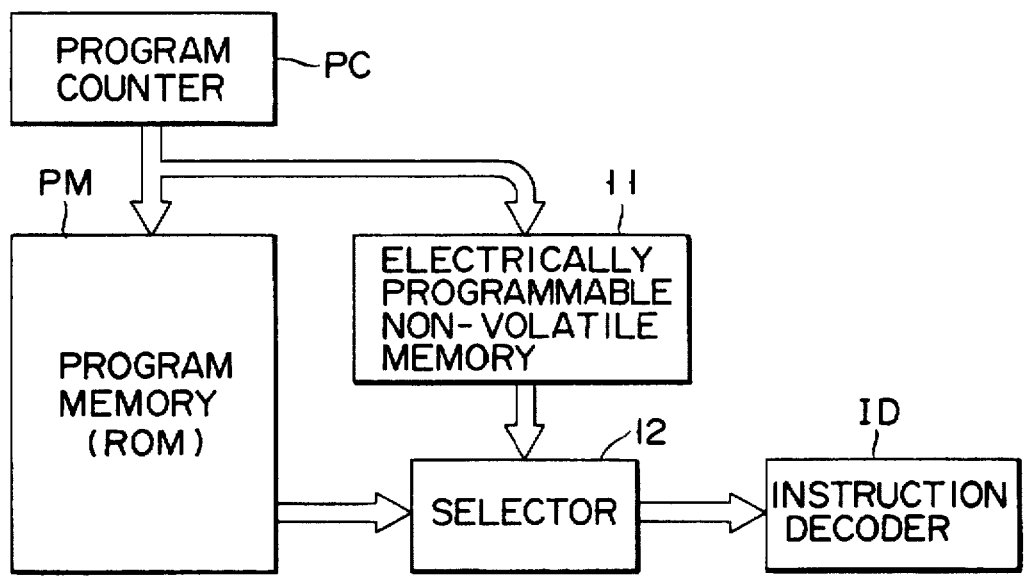
F I G. 2

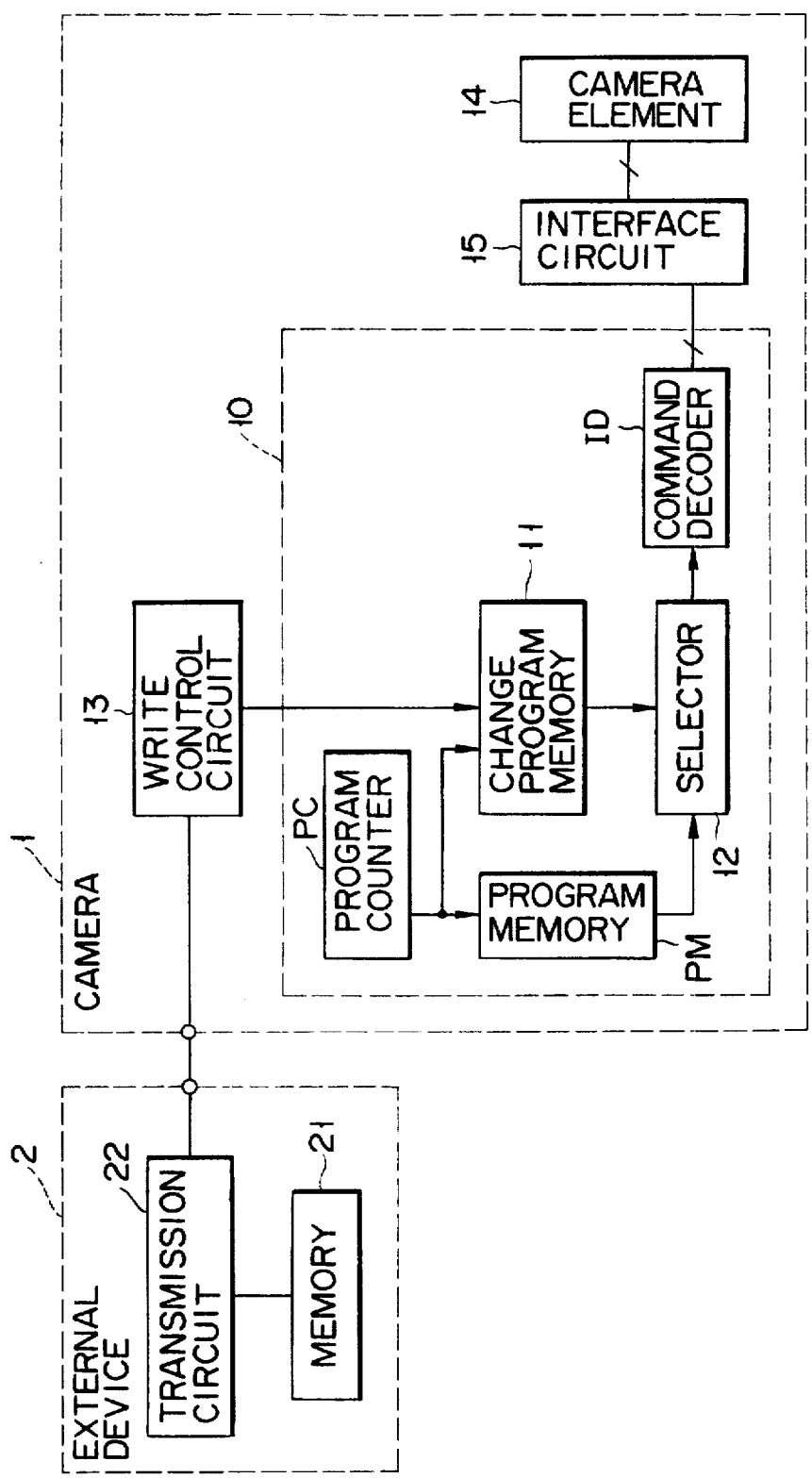
F I G. 3

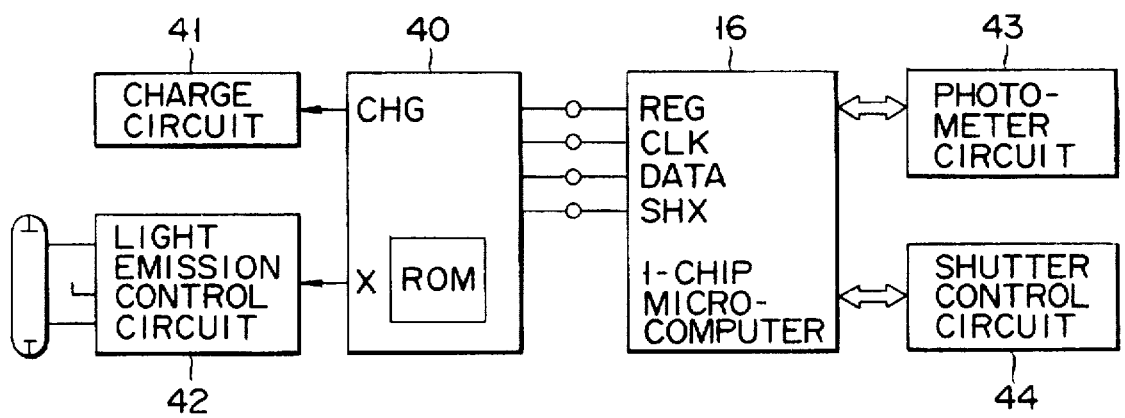
F I G. 6
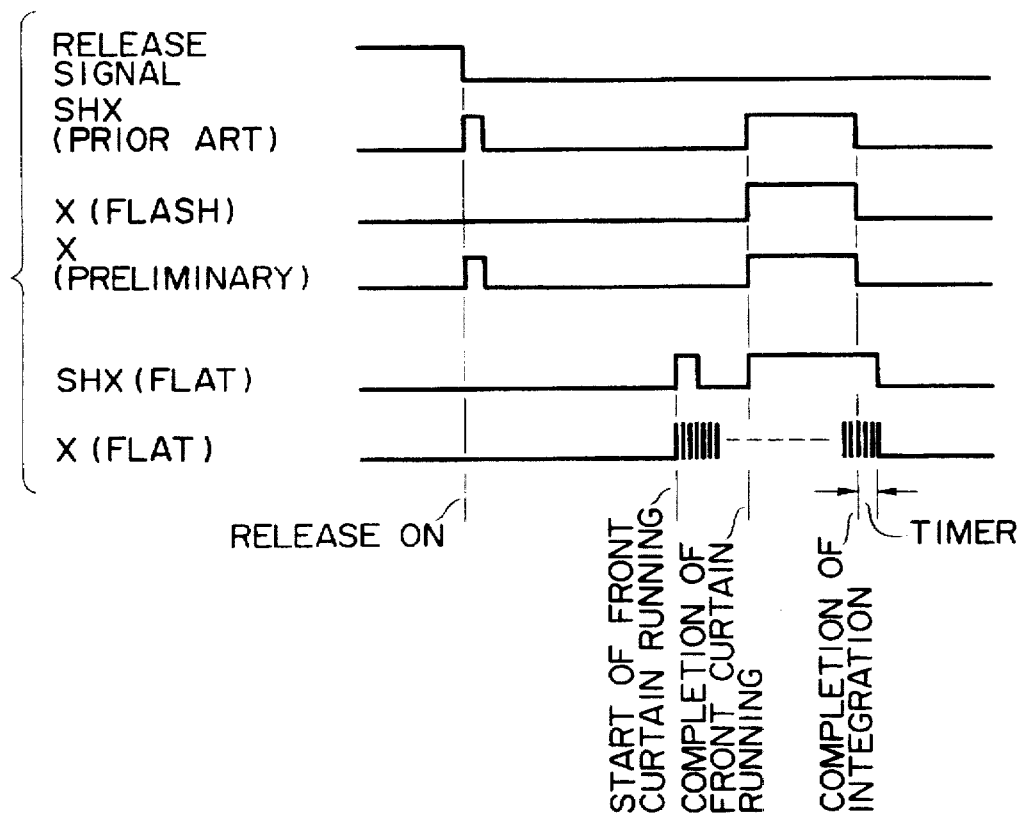
F I G. 7

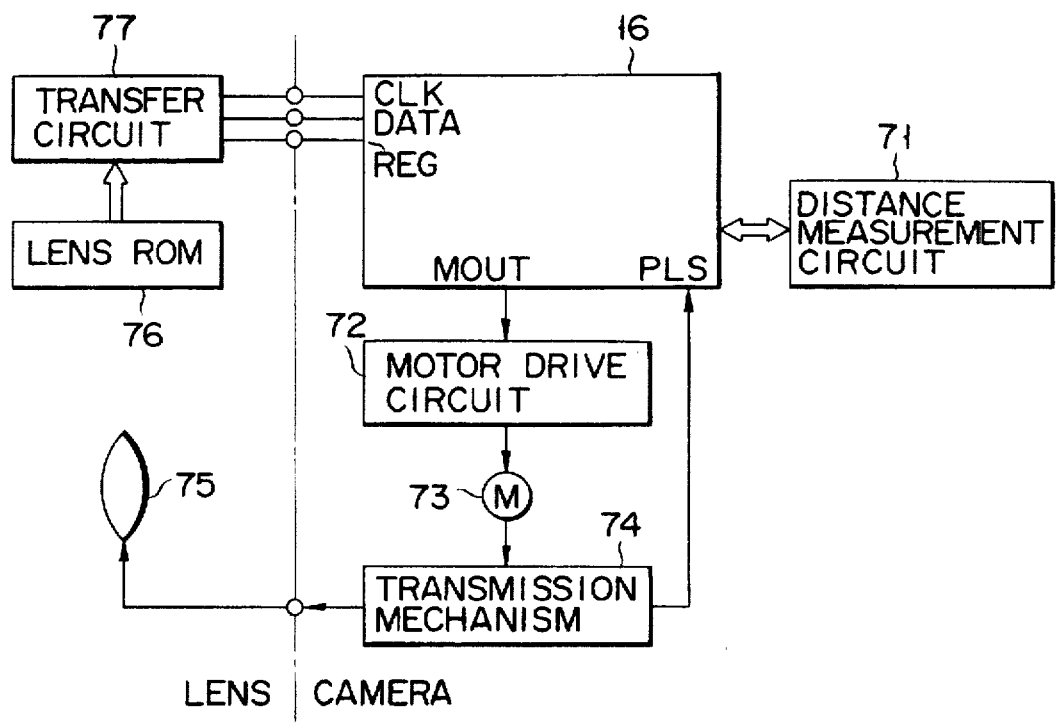
F I G. 9A
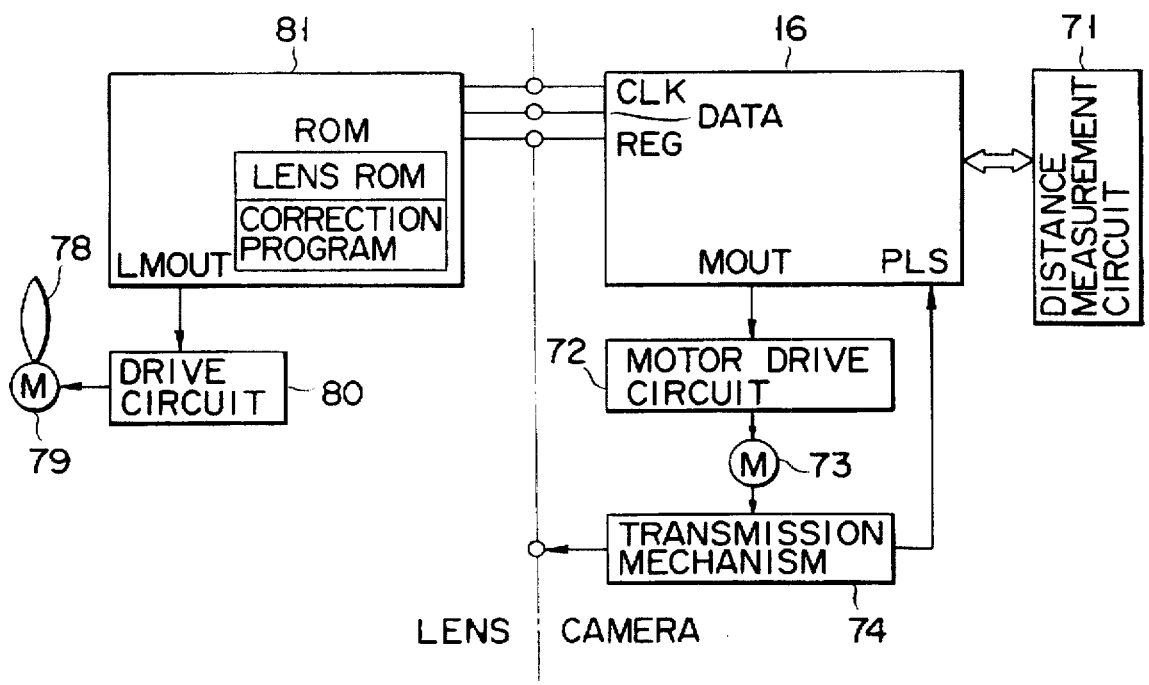
F I G. 9B

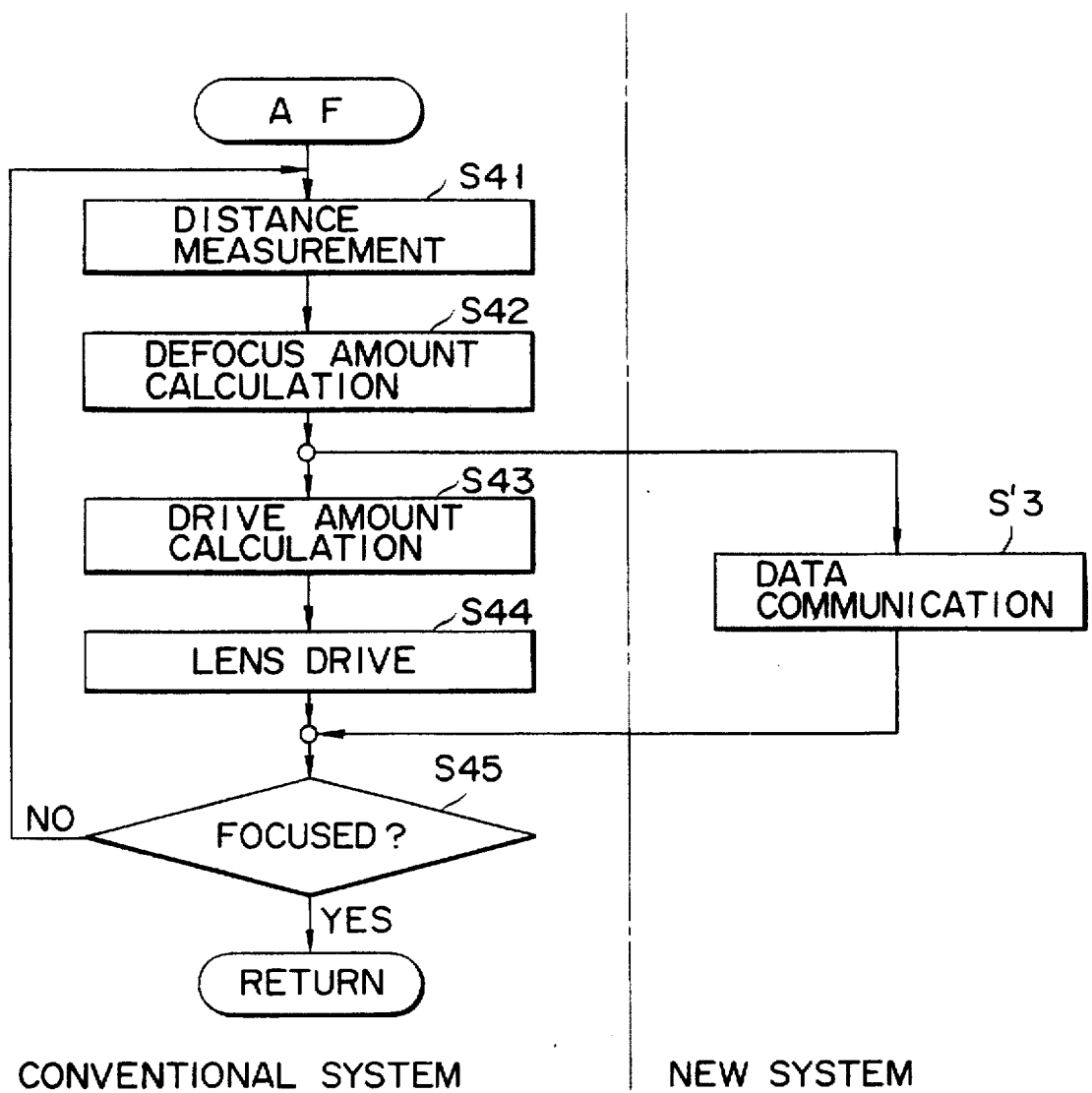
F I G. 10

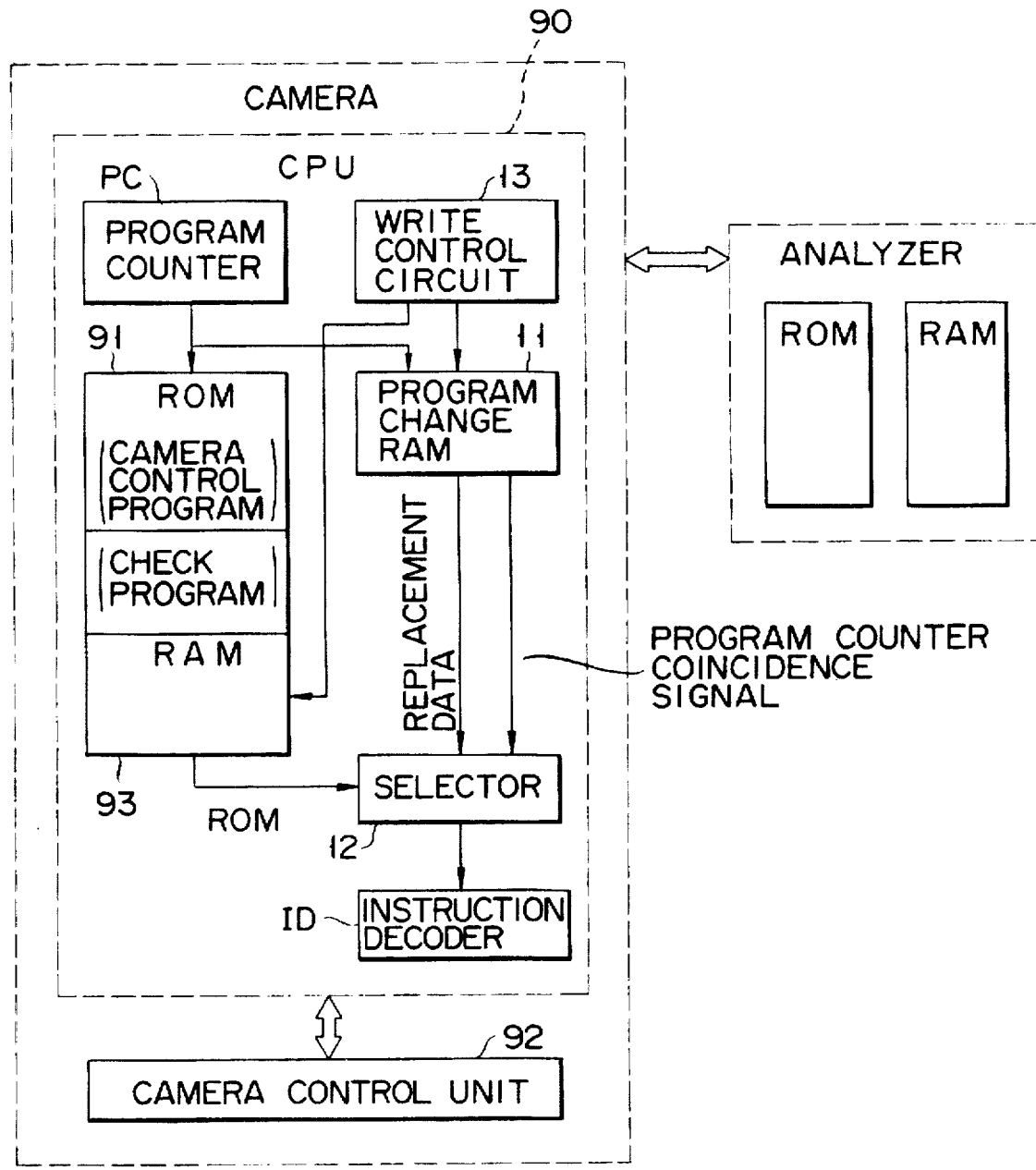
F I G. 11

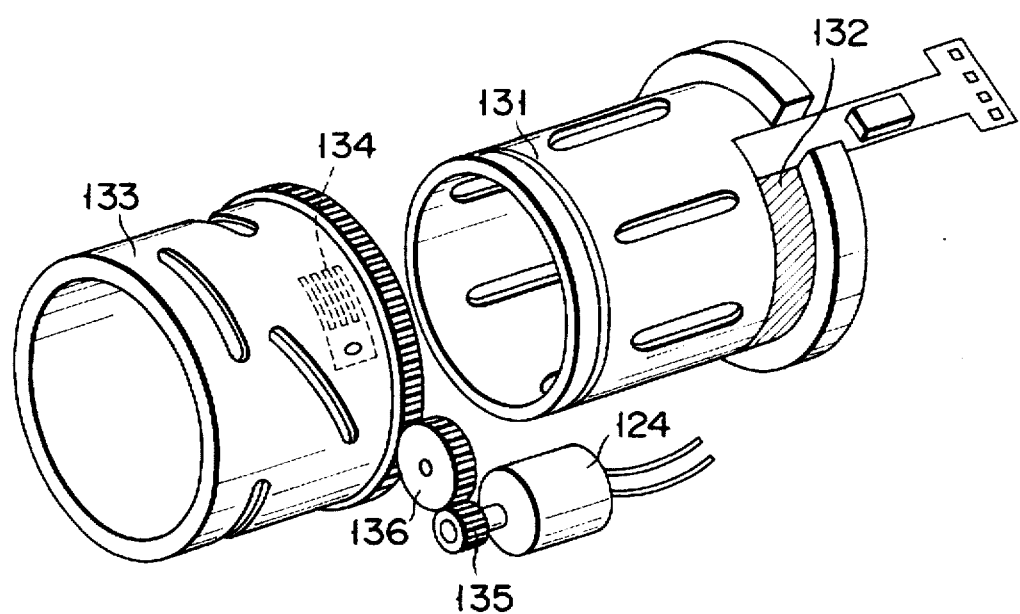
F I G. 15

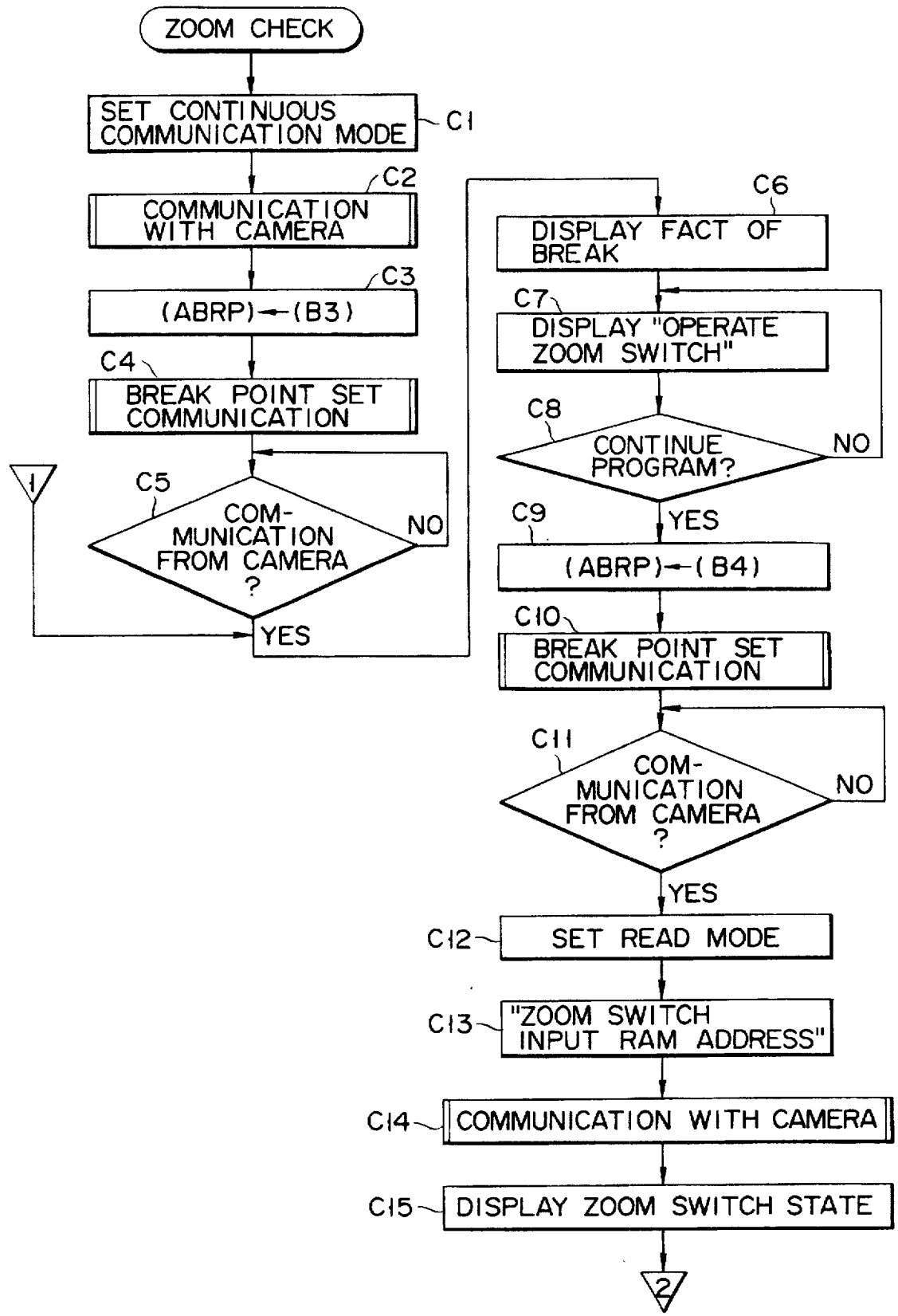
F I G. 17A

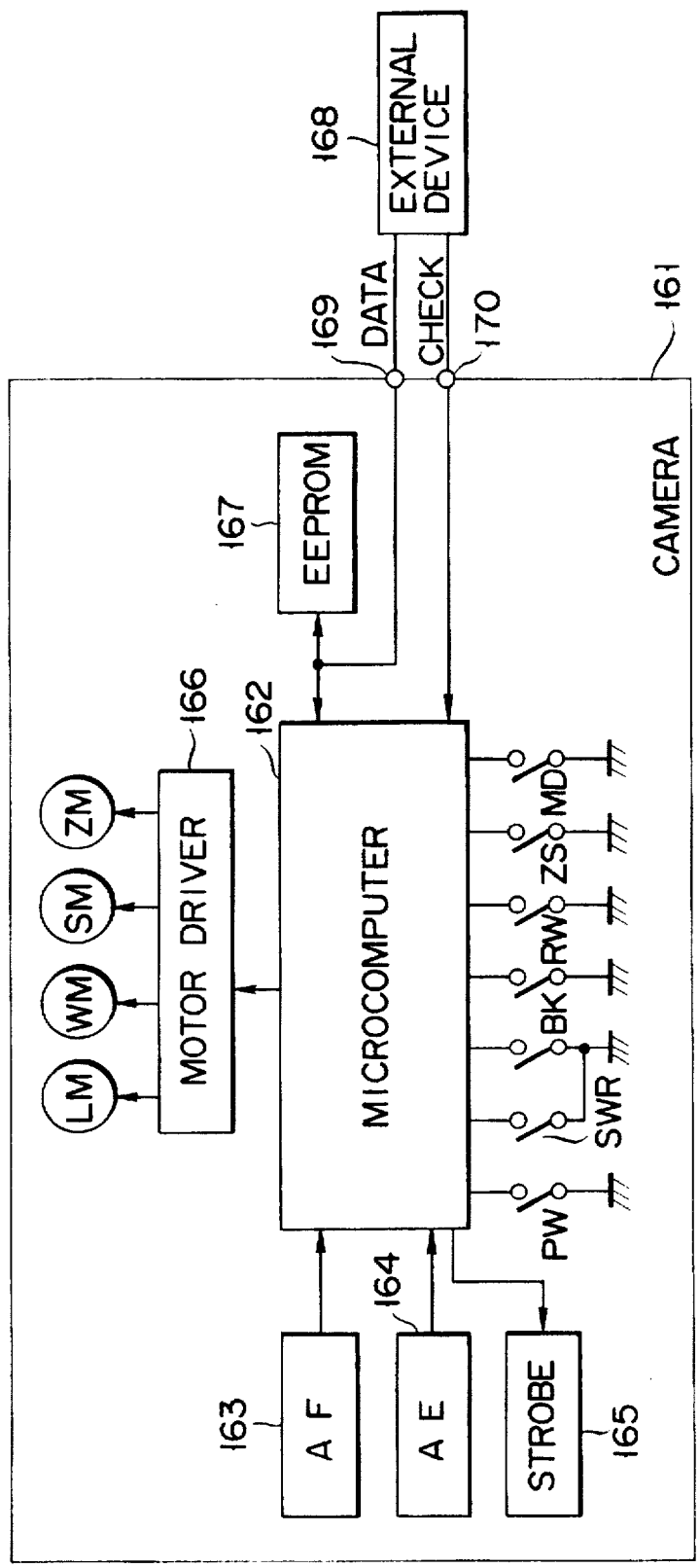
F I G. 18

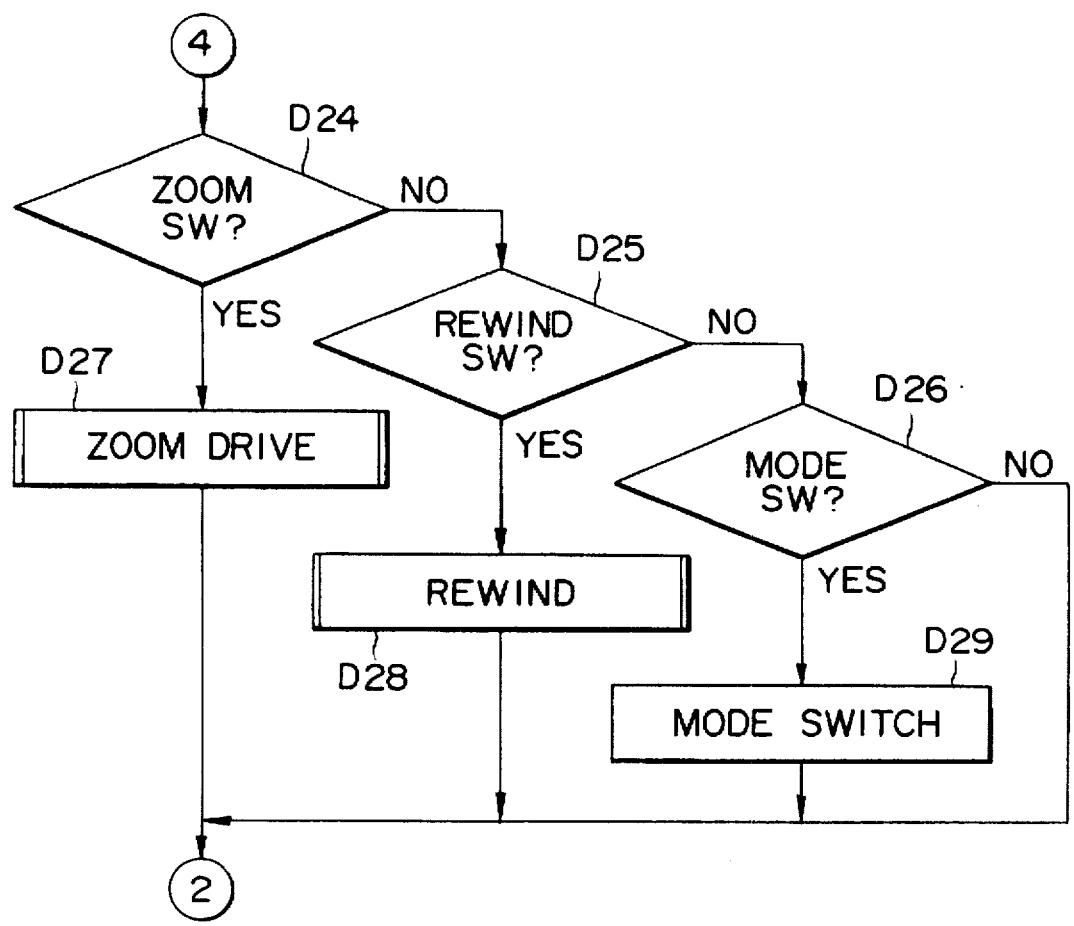
F I G. 19C

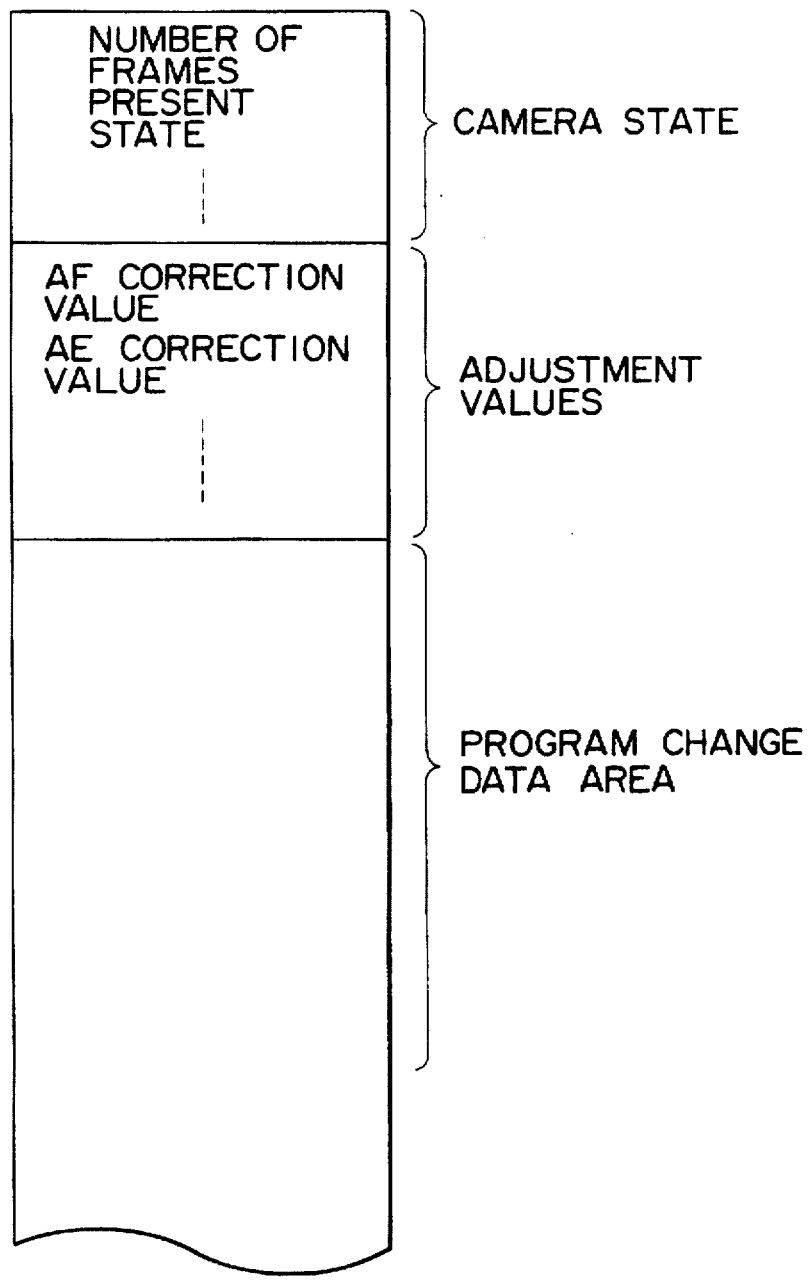
F I G. 20

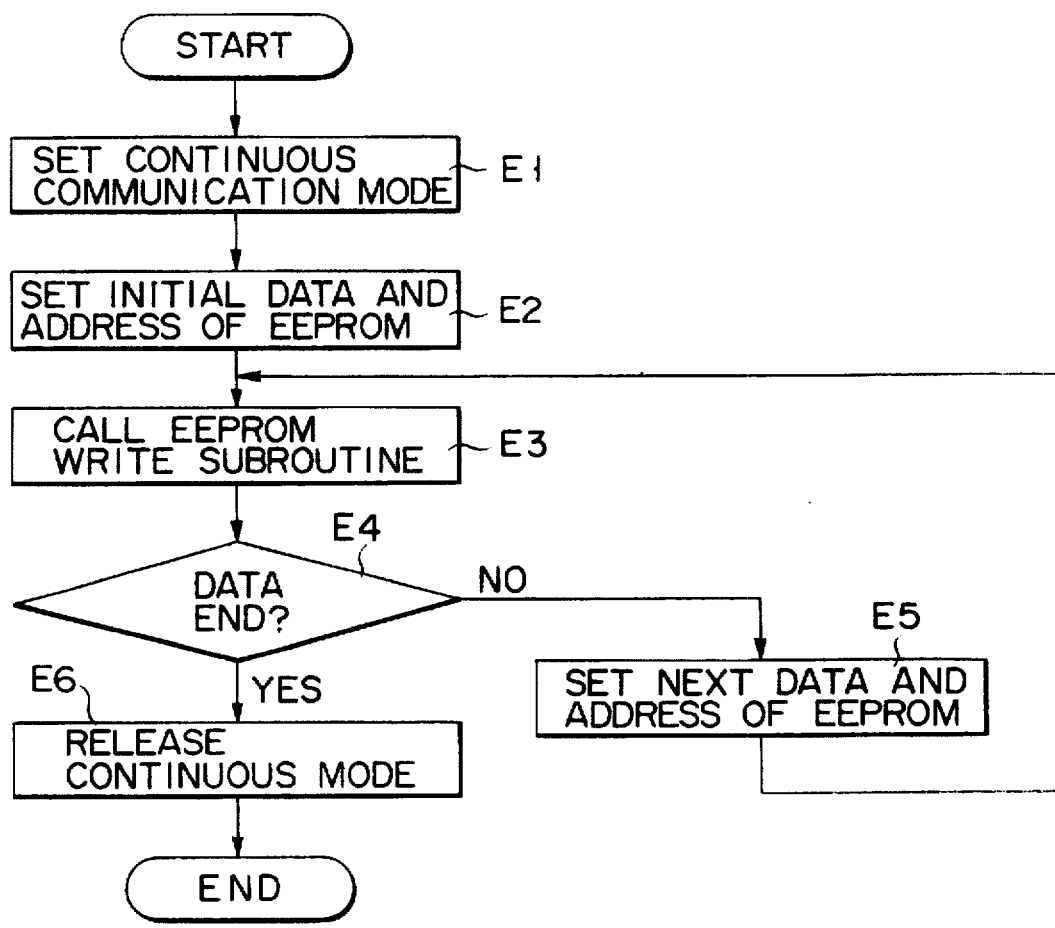
F I G. 21

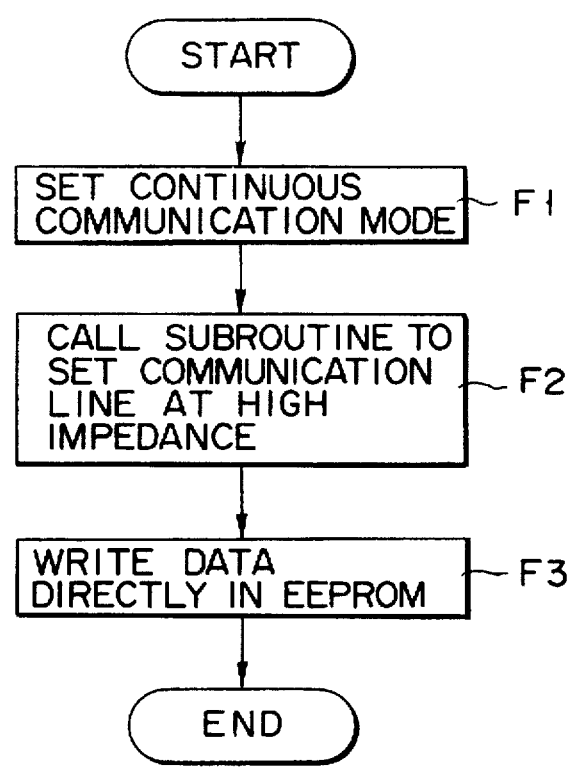
F I G. 22

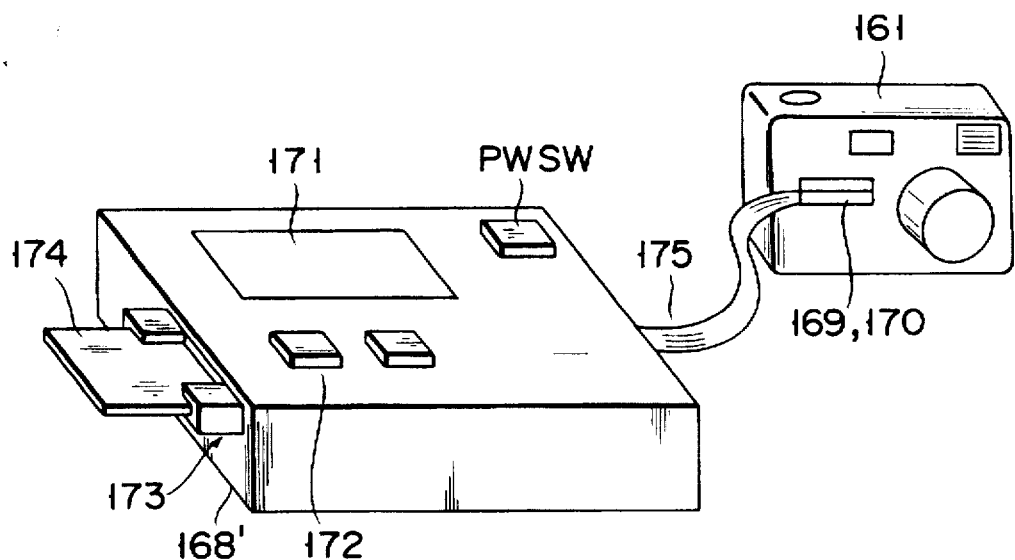
F I G. 25
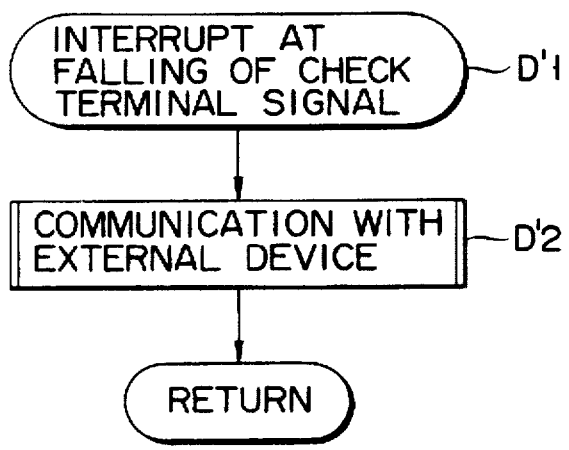
F I G. 26

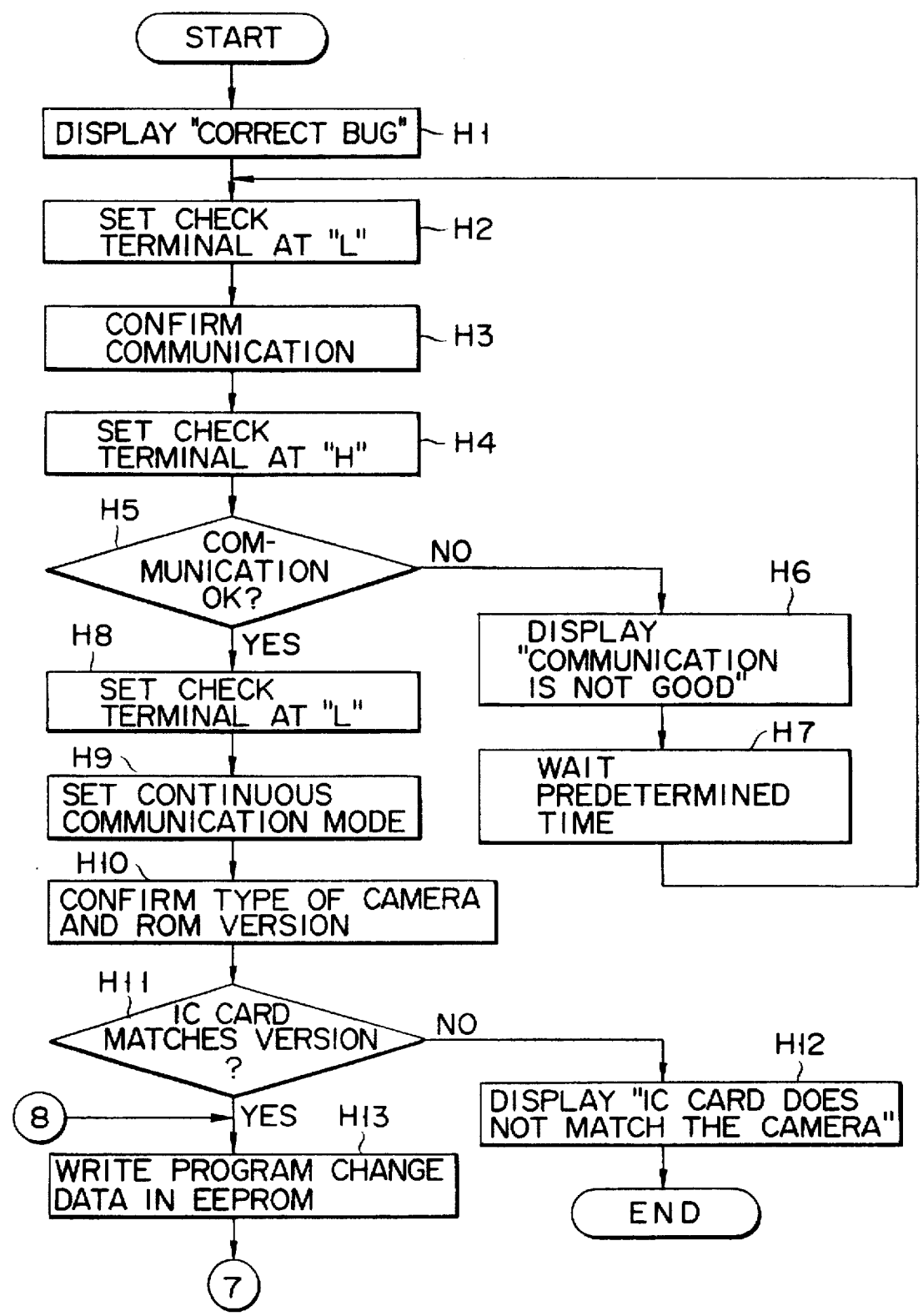
F I G. 27A

SYSTEM OPERABLE WITH A GIVEN APPARATUS AND CAPABLE OF PSEUDO-REWRITING A PROGRAM

This application is a continuation of application Ser. No. 07/742,606, filed Aug. 8, 1991, now abandoned.

BACKGROUND OF THE INVENTION

1. Field of the Invention

The present invention relates generally to a camera system, and more particularly to a camera system including a camera having a microcomputer capable of executing a changed program at the time of executing an address in a read-only memory to be changed, and an external device such as an accessory combined with the camera.

2. Description of the Related Art

A recently available camera is operated according to a program written in a read-only memory (ROM) of a one-chip microcomputer. The program is created to realize optimal operation of a combination of a camera system and an accessory. Specifically, such a camera system is constructed, as disclosed in Published Unexamined Japanese Patent Application (PUJPA) No. 58-223109 or PUJPA No. 58-166330. In the camera system, data stored in a lens device or a strobe device is transmitted to the camera body, and autofocus (AF) arithmetic operations and exposure arithmetic operations are carried out on the basis of the data received by the camera body. According to the obtained arithmetic values, the lens drive degree, stop operation degree, strobe light amount, and operations of accessories are controlled.

Normally, upon a power-on reset, the camera is successively operated according to a program from the initial address of a ROM, and the operation of the camera is finally stopped in a low power consumption mode. However, in this successive operation, it is not possible to stop the operation at a desired address by an external command, or to check the progress of the operation externally, e.g. program count data, random access memory (RAM) values, etc.

The program employed in the conventional camera system is designed to match all possible accessories. However, new materials and new techniques have recently been developed remarkably, accessories with new functions can possibly be produced. In such a case, the conventional camera system cannot employ new accessories with new functions. Disadvantageously, users of conventional camera systems have to purchase new camera systems in order to use new accessories.

An example of accessories is a strobe. A conventional strobe functions only to emit flash light. However, various types of strobes have recently been developed. Such new strobes include one capable of carrying out preliminary light emission for distance measurement prior to main light emission, one capable of carrying out preliminary light emission several times for preventing "pink-eye effect", one of flat emission type capable of matching a high-speed operation, etc. These strobes have different light emission timings. It is highly possible that strobes having different light emission timings will be designed, and it is very difficult to design cameras capable of matching such future strobes.

Another example of accessories is a lens. In a conventional camera system, distance measurement is performed on the camera body side and a lens is actuated by a camera-side actuator. If a new lens having a novel actuator is developed, the conventional camera system cannot match the new lens in electrical aspects, though it may match in mechanical aspects.

The applicant of the present application proposed an automatic camera capable of externally rewriting a program in PUJPA No. 63-163439. This camera, however, requires a device for program rewriting or a ROM corresponding to the above-mentioned accessories.

As stated above, in this successive camera program operation, it is not possible to stop the operation at a desired address by an external command, or to check the progress of the operation externally, e.g. program count data, random access memory (RAM) values, etc. It is thus difficult to check malfunction or performance of the manufactured camera.

The applicant also proposed an automatic camera having a self-checking function in PUJPA No. 63-212923. This camera contains a check program, and in the check mode each function of the camera is automatically checked. This camera, however, stores the check program in a built-in ROM and the program capacity of the camera increases. In addition, the check program must be determined at the time of designing the camera; therefore, it is not possible to perform the check by a non-programmed function or address after the camera has been manufactured.

SUMMARY OF THE INVENTION

An object of the present invention is to provide a camera system capable of optimally operating, when a novel accessory having a new function which is not considered at the time of designing the camera system is mounted in the camera system, without degrading the new function.

Another object of the invention is to provide a camera system capable of checking a desired function or performing a check at a desired address, even after the system has been manufactured, without increasing the program stored in the camera.

According to an aspect of the present invention, there is provided a camera system comprising: a microcomputer provided in a camera body, said microcomputer including a read-only memory for storing a series of program instructions for operating the camera, a program counter for designating addresses of the program instructions stored in the read-only memory, a replacement program memory for storing a change address and a replacement program instruction of a portion (step) to be corrected in said series of program instructions, said replacement program instruction being read out instead of the program instruction stored in the read-only memory when the change address coincides with the value of the program counter, and an instruction decoder for controlling a camera element via an interface circuit according to the program instruction output from the read-only memory or the replacement program instruction output instead of the program instruction; and a camera accessory combined with said camera body, said camera accessory including memory means for storing a change address and a replacement program instruction for making necessary correction in order to use said series of program instructions stored in the read-only memory in combination with the camera accessory, transmission means for transmitting the change address and the replacement program instruction stored in said memory means to the camera body, and write control means, provided in the camera body, for receiving the change address and the replacement program instruction transmitted by the transmission means and writing the same into the replacement program memory.

According to another aspect of the invention, there is provided an analyzing system, coupled to a camera body, for stopping the continuous operation of the camera at a given step, thereby analyzing the operation of the camera, comprising: a microcomputer provided in the camera body, said microcomputer including a read-only memory for storing a series of program instructions for operating the camera, a program counter for designating addresses of the program instructions stored in the read-only memory, a replacement program memory for storing a change address of a portion, at which the sequential operation based on said series of program instructions is stopped, and a replacement program instruction for effecting the stopping operation, said replacement program instruction for effecting the stopping operation being read out instead of the program instruction stored in the read-only memory when the change address coincides with the value of the program counter, and an instruction decoder for controlling a camera element via an interface circuit according to the program instruction output from the read-only memory or the replacement program instruction output instead of the program instruction; and an analyzer combined with said camera body, said analyzer including memory means for storing a change address of the step, at which the processing is to be stopped, in said series of program instructions stored in the read-only memory, and a replacement program instruction for stopping the processing, transmission means for transmitting the change address and the replacement program instruction stored in said memory means to the camera body, and write control means, provided in the camera body, for receiving the change address and the replacement program instruction transmitted by the transmission means and writing the same into the replacement program memory, wherein said microcomputer of the camera body temporarily stops the operation of the camera when the change address coincides with the value of the program counter.

According to still another aspect of the invention, there is provided a camera system comprising: a microcomputer provided in a camera body, said microcomputer including a read-only memory for storing a series of program instructions for operating the camera, a program counter for designating addresses of the program instructions stored in the read-only memory, a replacement program memory for storing a change address and a replacement program instruction of a portion to be corrected in said series of program instructions, said replacement program instruction being read out instead of the program instruction stored in the read-only memory when the change address coincides with the value of the program counter, and an instruction decoder for controlling a camera element via an interface circuit according to the program instruction output from the read-only memory or the replacement program instruction output instead of the program instruction; and an external device, combined with said camera body, for correcting a step of a portion of said series of program instructions stored in the read-only memory, said external device including memory means for storing a change address of a step requiring the correction in said series of program instructions and a replacement program instruction, transmission means for transmitting the change address and the replacement program instruction stored in said memory means to the camera body, a non-volatile memory, provided in said camera body, for receiving the change address and the replacement program instruction transmitted by the transmission means while the external device is connected to the camera body, said change address and the replacement program instruction being written in the non-volatile memory and being kept even after the external device is disconnected from the camera body, and write control means for writing the change address and the replacement program instruction stored in the non-volatile memory into the replacement program memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a conventional microcomputer;

FIG. 2 is a block diagram showing a microcomputer according to a senior patent application of the present applicant;

FIG. 3 is a block diagram illustrating the concept of a camera system according to the present invention in which a camera and an external device are combined;

FIG. 6 is a block diagram showing a camera system in the case where the external device of the camera system of FIG. 4 is a strobe;

FIG. 7 shows a light emission timing signal of a conventional strobe and a light emission timing signal of a novel flat light emission strobe in the camera system shown in FIG. 6;

FIG. 9A is a block diagram showing the camera system of FIG. 4 in which the external device is a conventional lens;

FIG. 9B is a block diagram showing the camera system of FIG. 4 in which the external device is a novel lens;

FIG. 10 is a flowchart illustrating the AF operation in the camera system of FIGS. 9A and 9B;

FIG. 11 is a block diagram schematically showing the camera system of FIG. 4, wherein the external device is an analyzer;

FIG. 15 is an exploded perspective view showing in detail a zoom motor and a zoom encoder in FIG. 10;

FIGS. 17A and 17B are flowcharts showing a program of an analyzer for analyzing a malfunction, up to the zoom switch condition input subroutine in the zooming operation sequence in FIG. 16;

FIG. 18 shows a camera system capable of correcting a bug in a CPU after the camera system is manufactured, by use of a built-in EEPROM;

FIGS. 19A through 19C are flowcharts illustrating the operation of the camera system of FIG. 18;

FIG. 20 shows an example of a memory map in the EEPROM in the camera system of FIG. 18;

FIG. 21 is a flowchart illustrating an example of the data write operation of the EEPROM;

FIG. 22 is a flowchart illustrating another example of the data write operation of the EEPROM;

FIG. 25 shows a camera system in which a camera is combined with a write device for writing program change data in an EEPROM built in the camera;

FIG. 26 is a flowchart of an interrupt program, for illustrating the operation of the camera system of FIG. 24; and FIGS. 27A and 27B are flowcharts illustrating the operation of the camera system of FIG. 24 which is performed only by commands from an external device.

DETAILED DESCRIPTION OF THE PREFERRED EMBODIMENTS

Figure 4:
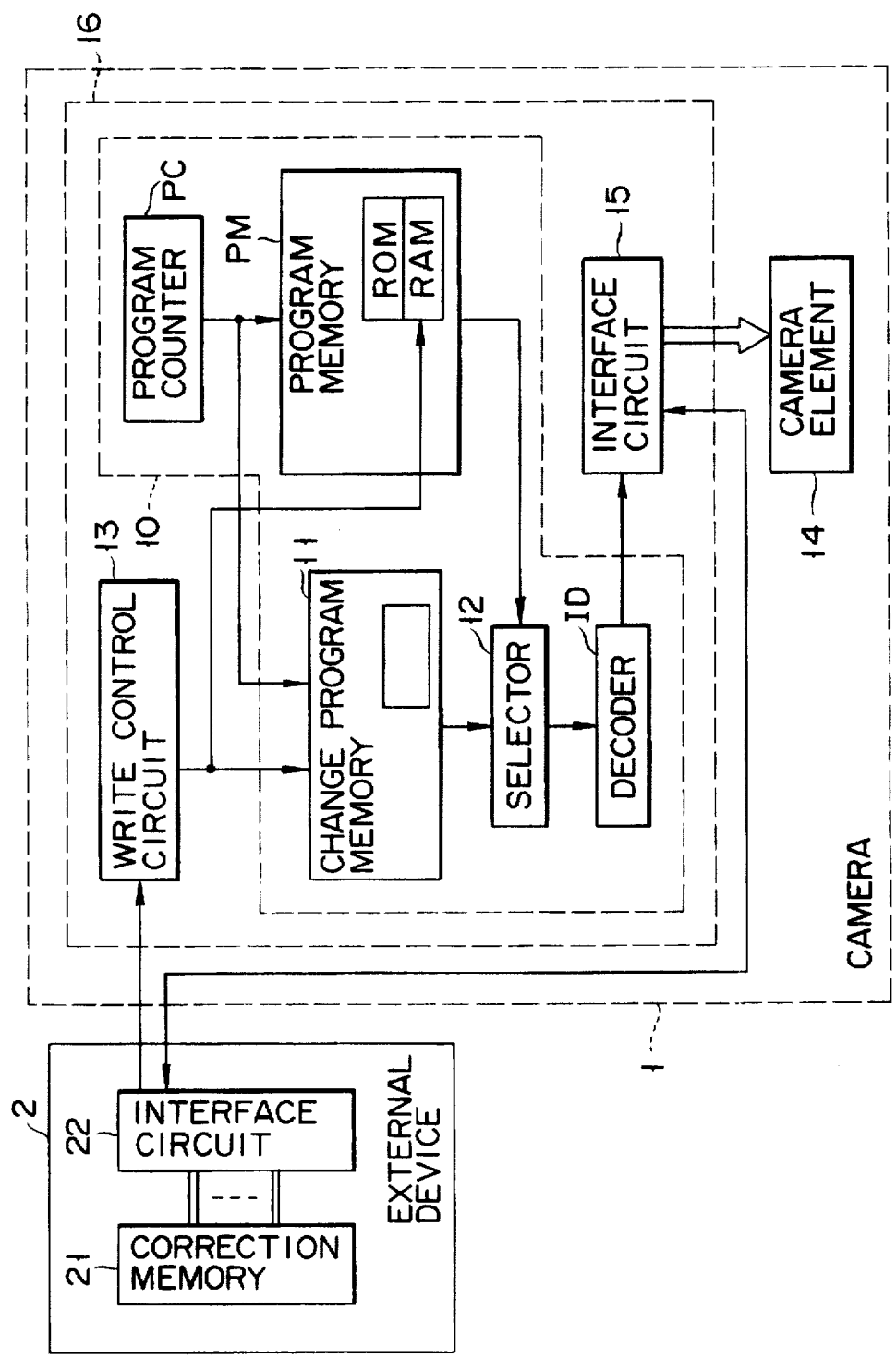
FIG. 4 is a block diagram showing a camera system according to an embodiment of the invention.

Before describing embodiments of the present invention, a microcomputer used in a camera system, which can rewrite a program in a pseudo-manner, will be described.

FIG. 1 shows a conventional microcomputer, and it comprises a program counter PC, a program memory PM and an instruction decoder ID. Program data stored in the program memory PM is successively read out by the operation of the program counter PC. The read-out data is decoded by the instruction decoder ID, thereby executing the program.

The program memory PM is generally a mask ROM. A program is stored in the memory PM during the manufacturing process, and the program cannot be rewritten thereafter.

The applicant of the present application disclosed, in U.S. patent application Ser. No. 496,807, a microcomputer to which a replacement program memory is added to change part of the program in a pseudo-manner without rewriting the contents of the ROM.

This microcomputer additionally comprises a replacement program memory (electrically erasable programmable read-only memory) 11 and a selector 12, as shown in FIG. 2. The replacement program memory 11 stores address data of a program memory to be substituted and replacement program data. The microcomputer compares the value of the program counter PC and the replacement address data in the replacement program memory 11. If they coincide, the replacement program data stored in the replacement program memory 11 is selected by the selector 12. The replacement program data is decoded by the instruction decoder ID. By performing the processing corresponding to the replacement program data, the contents of the program can be changed in a pseudo-manner. Since this microcomputer is described in U.S. patent application Ser. No. 496,807, a description thereof is omitted here. The camera system of the present invention employs this microcomputer.

Embodiments of the present invention will now be described in detail with reference to the accompanying drawings.

Referring to FIG. 3, the concept of the camera system of the present invention will first be described. In FIG. 3, reference numeral 1 denotes a camera, and numeral 2 an external device. The camera 1 comprises the microcomputer 10 (program counter PC, program memory PM, instruction decoder ID, replacement program memory 11, selector 12), a write control circuit 13 for receiving replacement data from the external device 2 and writing it in the replacement program memory 11 in the microcomputer 10, and an interface circuit 15 for controlling a camera device 14 in accordance with the decoded value output from the instruction decoder ID in the microcomputer 10.

On the other hand, the external device 2 comprises a memory 21 for storing replacement address data of the microcomputer mounted in the camera 1 and replacement program data, and a transmission circuit 22 for reading out the data from the memory 21 and transmitting it to the camera 1.

FIG. 4 is a block diagram showing a camera 1 and an external device 2 according to an embodiment of the invention. The camera 1 comprises a one-chip microcomputer 16 and a camera element 14. The one-chip microcomputer 16 is constituted by forming the microcomputer 10, write control circuit 13 and interface circuit 15 on one chip. The camera element 14 controls various camera operations associated with the one-chip microcomputer 16. Specifically, the camera element 14 includes a display control circuit, a shutter control circuit, an AF control circuit, and a data output circuit.

On the other hand, the external device 2 comprises a correction memory 21 for storing replacement address data and replacement program data, and a microcomputer for external device including an interface circuit 22.

Figure 5:
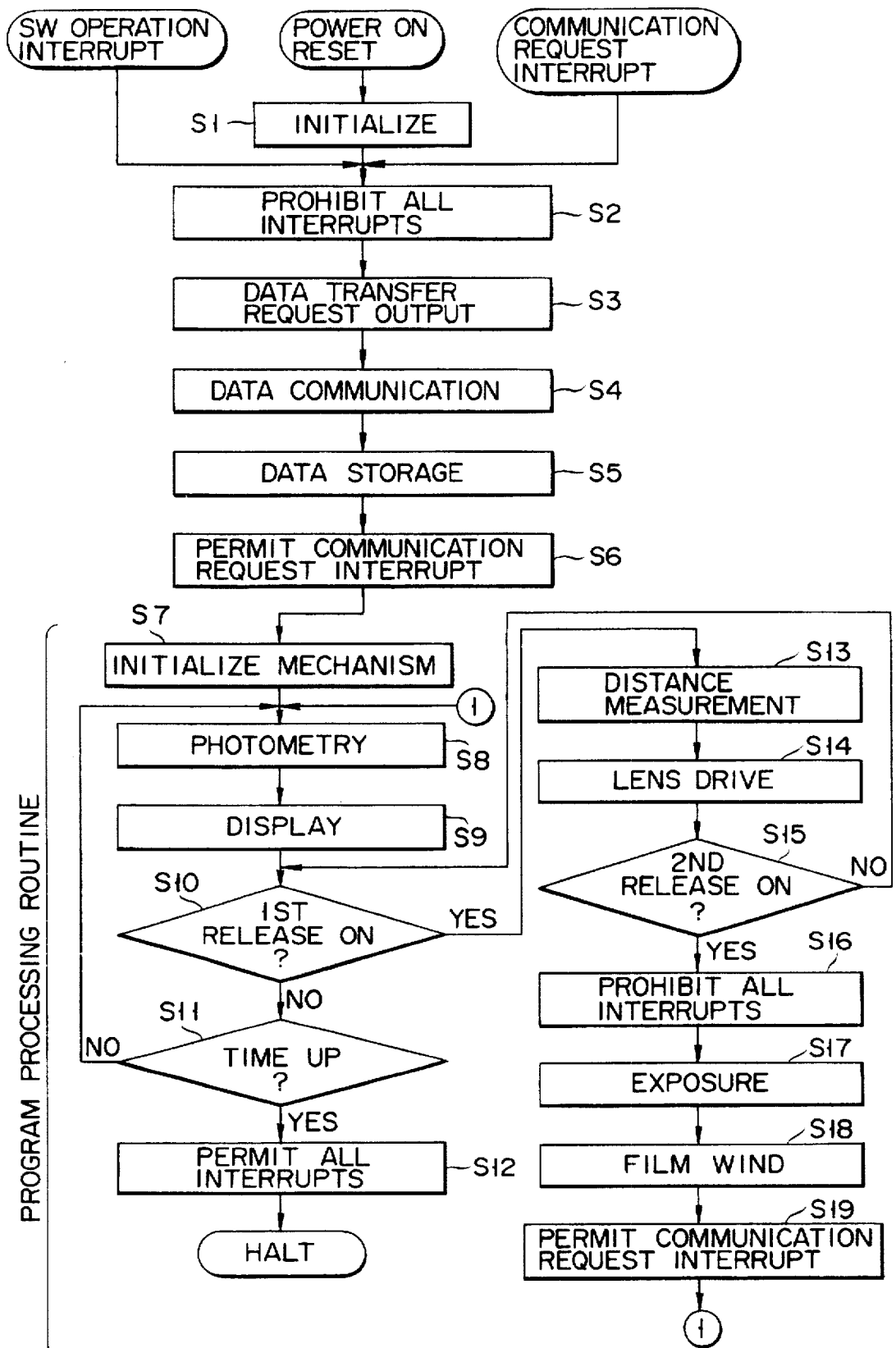
FIG. 5 is a flowchart illustrating the system operation in the case where a camera accessory is employed as the external device of the camera system shown in FIG. 4.

An example of the operation of the system of FIG. 4, in the case where the external device 2 is a camera accessory, will now be described with reference to the flowchart of FIG. 5.

When the system is powered on and reset, the one-chip microcomputer 16 of camera 1 is initialized (step S1). In step S2, the one-chip microcomputer 16 of camera 1 prohibits all interrupts. In step S3, a data transfer request signal is output to the microcomputer of the accessory 2. In step S4, serial data communication is performed between the camera and the accessory 2. At this time, the data transferred from the accessory 2 includes well-known data associated with the accessory and replacement data.

In step S5, in the camera 1, the data associated with the accessory is written in a RAM in the program memory PM, and the replacement data is written in the replacement program memory 11. Since the number of data associated with the accessory is set, these two kinds of data can be easily sorted by determining a predetermined number of data in the transferred data to be the data associated with the accessory and determining the remaining data to be replacement data.

In step S6, the one-chip microcomputer 16 of camera 1 permits the interrupt of communication request output from the accessory, and advances the value of the program counter PC in synchronism with the system clock, and carries out processing in accordance with data in program memory PM based on the advanced value.

In the program processing routine of steps S7 to S19, the value of program counter PC and the replacement address data in replacement program memory 11 are compared in hardware aspects. When the value of program counter PC coincides with the replacement address data, the replacement program data stored in the replacement program memory 11 in combination with the replacement address data is output to the selector 12. When data is output from the replacement program memory 11, the selector 12 outputs the replacement program data to the instruction decoder ID, instead of outputting program data from the program memory PM. Thus, the program is replaced and changed.

In the above-described flowchart, data communication is carried out at the time of the power on. However, in this embodiment, data communication is effected when various interrupts are generated.

Specifically, when switches such as a release switch and a rewind switch are operated in a HALT mode (low power consumption mode), a "switch operation interrupt" is generated, and the above data communication is carried out. In addition, when the accessory is powered on, the operation switch of the accessory is operated or the accessory is removed, "communication request interrupt" is generated and data communication is effected. In this case, when the accessory is removed, the interrupt is generated and data communication is effected; however, data transfer is not effected. Thus, the replacement program memory is cleared, and the program is not changed. In other words, the control is returned to the original program.

Further, in the case where a plurality of accessories are provided and each accessory has replacement data, the one-chip microcomputer 16 of the camera outputs a transfer request signal successively to the accessories and stores data supplied from the accessories. Thus, each accessory replacement data can be stored in the replacement program memory.

An embodiment wherein a strobe is used as an accessory will now be described by referring to a camera system shown in FIG. 6.

In the camera system of FIG. 6, reference numeral 40 denotes a one-chip microcomputer, 41 a charge circuit, 42 a light emission control circuit, 16 a one-chip microcomputer of camera 1, 43 a photometer circuit, and 44 a shutter control circuit. A request signal REQ, a clock signal CLK, replacement data DATA and a SHZ signal are transmitted between the one-chip microcomputer 40 of the strobe and the one-chip microcomputer 16 of camera 1. In this embodiment, the camera element 14 in FIG. 4 corresponds to a data output circuit, and in particular to an output circuit for outputting a light emission timing signal supplied from the camera 1 to the strobe.

It is supposed that the strobe used in the conventional system can effect flash light emission with one-time preliminary light emission, while the novel strobe is, for example, a flat light emission strobe.

FIG. 7 shows a light emission timing signal of the strobe of the conventional system and a light emission timing signal of the flat light emission strobe of the new system. It is understood that light emission timing differs between the conventional system and the new system.

Figure 8:
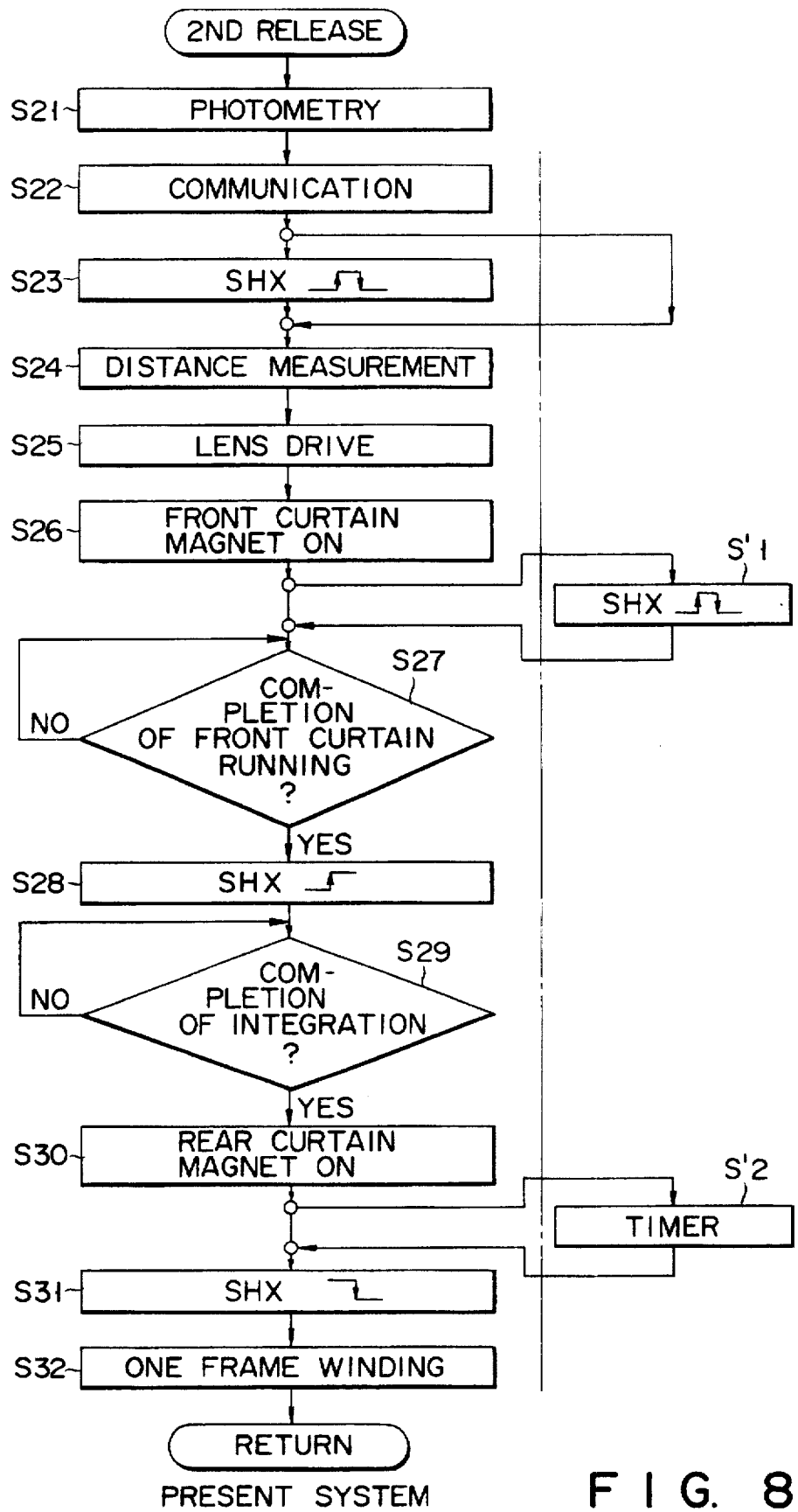
FIG. 8 is a flowchart illustrating the operation following the input of a second release signal in the camera system of FIG. 6.

FIG. 8 is a flowchart illustrating an example of the operation after a second release signal is input to the one-chip microcomputer 16 of camera 1 in the camera system of FIG. 6. In FIG. 8, white circles denote the coincidence between the value of the program counter PC of camera 1 and the replacement address data.

When a second release signal is input, the camera 1 performs photometry (step S21), and photometry data is sent to the strobe (step S22). When the strobe of the conventional system is mounted, a first SHX signal is output from the camera 1 to the strobe (step S23). On the other hand, when the flat light emission strobe of the new system is mounted, the instruction address for outputting the SHX signal agrees with the replacement address in the camera 1, and the SHX signal output instruction is jumped in the replacement program.

When the SHX signal is input, the strobe of the conventional system does not operate at the time of flash emission, but outputs an X-signal to the light emission control circuit 42 at the time of preliminary light emission in accordance with the SHX signal. Thereafter, distance measurement (step S24), lens drive (step S25) and a front curtain magnet on-drive (step S26) are carried out.

In the case where the flat light emission strobe of the new system is mounted, a first SHX signal is output from the camera 1 to the strobe at the time of starting a front curtain run (step S'1). In this case, in the camera 1, the replacement address data coincides with the value of the program counter PC. The flat light emission strobe, upon receiving the SHX signal, starts the flat light emission.

The completion of the front curtain running is checked (step S27). If the front curtain running is completed, a second SHX signal indicating a flash emission start is output (step S28). The flat limit emission strobe has already started the flat light emission, and it does not react with the second SHX signal. By contrast, the strobe of the conventional system is synchronized with the second SHX signal and outputs an X-signal.

The completion of integration is checked (step S29). If integration is completed, a rear curtain magnet is driven (step S30). Where the strobe of the conventional system is mounted, a second SHX signal is turned off in synchronism with the turning-on of the rear curtain magnet (step S31). By contrast, if the flat light emission strobe is mounted, the control stands by for a time counted by a timer until the rear curtain running is finished (step S'2) and the second SHX signal is turned off. The strobe also turns off the X-signal in synchronism with the turning-off of the second SHX signal. Thus, the strobe stops light emission. Thereafter, one frame is wound up (step S32) and a single exposure is finished.

As seen from the above flowchart, the control can be carried out even if the new strobe is mounted in the conventional camera system.

An embodiment wherein a lens is used as an accessory will now be described with reference to FIG. 9A and FIG. 9B. FIG. 9A shows a camera system in which a conventional lens is mounted, and FIG. 9B shows a camera system in which a novel lens is mounted.

Supposing that the focus device is designed to perform in-camera distance measurement and in-camera driving, the camera comprises a one-chip microcomputer 16, a distance measurement circuit 71, a motor drive circuit 72, a lens drive motor 73 and a transmission mechanism 74. The conventional lens comprises a lens body 75, a lens ROM 76, and a transfer circuit 77. The novel lens comprises a lens body 78, a lens drive motor 79, a motor drive circuit 80 and a CPU (central processing unit) 81.

FIG. 10 is a flowchart illustrating an example of the AF operation in the camera systems of FIGS. 9A and 9B. White circles in the flowchart indicate agreement between the value of the program counter PC of camera 1 an the replacement address data.

When the AF subroutine is called in the one-chip microcomputer 16 of the camera, distance measurement is effected by the distance measurement circuit 71 in the camera 1 (step S41) and a defocusing amount is calculated (step S42). Where the lens is mounted, the lens drive amount is calculated from the defocusing amount (step S43) and the calculated result is output to the motor drive circuit 72 to drive the lens (step S44). However, where the novel lens is mounted, only the defocusing amount data is sent to the lens, and the lens-side CPU 81 calculates the drive amount and drives the lens. In this case, the operation of the one-chip microcomputer 16 of camera 1 is changed to carry out a program for sending the defocusing amount data to the lens before the drive amount calculation (step S'3). After the completion of the communication, the control is jumped to the program for focus judgment (step S45).

As seen from the above flowchart, only by mounting the novel lens in the conventional system, the system of in-camera distance measurement and in-camera driving can be changed to the system of in-camera distance measurement and in-lens driving.

An embodiment of the invention wherein an analyzer is employed as an external device will now be described with reference to FIG. 11. FIG. 11 illustrates a concept of the camera system.

In the camera system shown in FIG. 11, a ROM 91 of a CPU 90 of the camera stores a camera control program and a check program. Normally, in the camera, a camera control unit 92 is operated according to the camera control program, thereby carrying out photographing operations, etc. According to the check program, the communication between the camera and an analyzer connected to the camera is carried out and the contents of a program change RAM 11 of the CPU 90 of the camera are altered.

Specifically, the analyzer writes a "CALL" sentence to the program change RAM 11 of the camera. The "CALL" sentence corresponds to the change contents of a program address ("break point") to be checked in a program to be subjected to a bug test. The "CALL" sentence is associated with a communication program of the check program for communication with the analyzer. Thereafter, the program to be subjected to the bug test is run. When the program of the camera runs to the break point, the value of the program counter PC and the address (break point) of the program change RAM 11 coincide, and the communication with the analyzer is automatically started according to the "CALL" sentence.

Necessary I/O ports, the contents of the RAM, etc., are checked, and the "CALL" sentence associated with the communication program is set at the next break point. The program is run once again from the break point. This is repeated and, while break point check is carried out at given program addresses, it can be checked whether the program is normally run. Thus, when abnormality is present in the camera, the location of abnormality can be automatically found.

Figure 12:
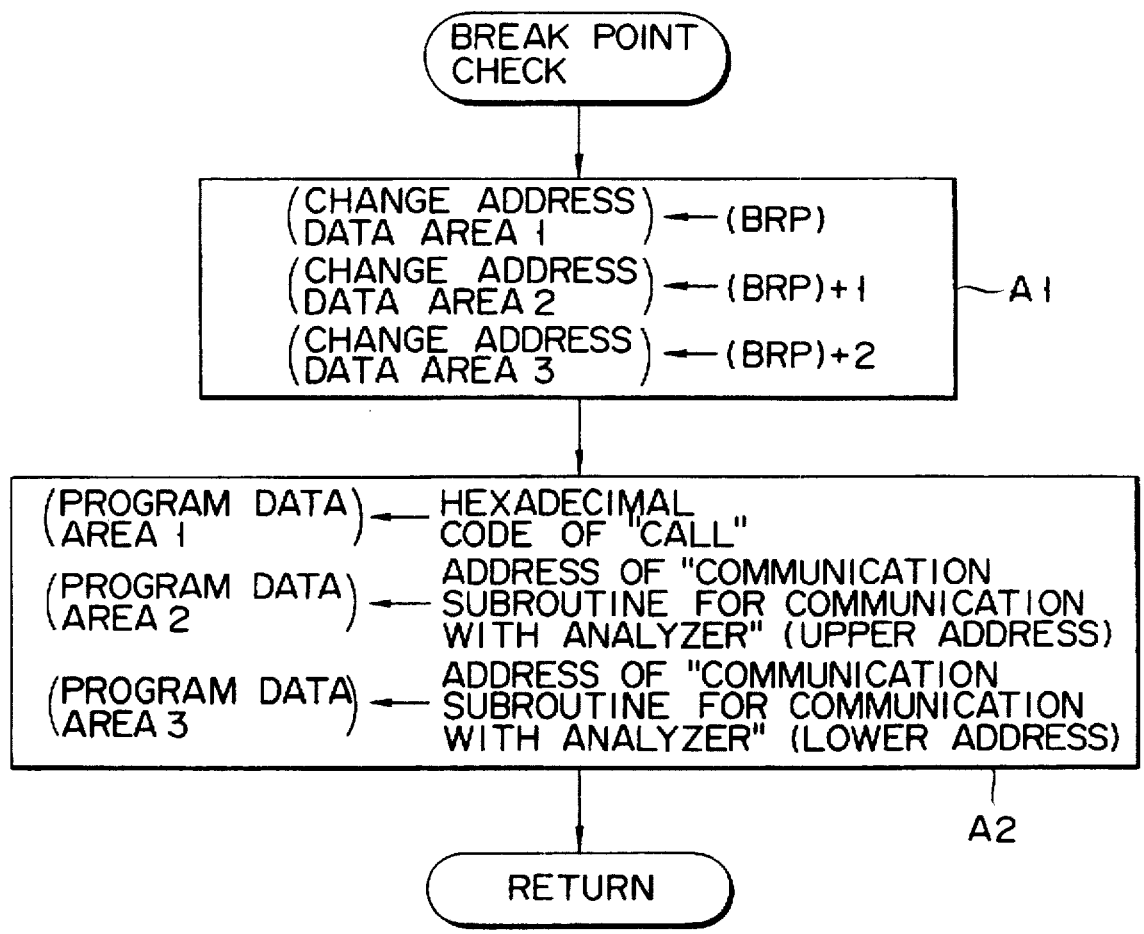
FIG. 12 is a flowchart illustrating a break point setting subroutine which is a part of a camera-side check program in the camera system of FIG. 11.

FIG. 12 shows a break point check subroutine which is a portion of the check program stored in the ROM 91 of the camera. In this context, the check program means a break point set subroutine and a communication subroutine for communication with the analyzer. Change address data areas 1 to 3 and program data areas 1 to 3 are included in the program change RAM 11 in the camera. "BRP" denotes an address in a normal RAM 93 in the CPU 90 of the camera, at which break points are present.

Each of program data areas 1 to 3 has one byte, an instruction code of "CALL" has one byte, and a ROM address space of the camera is two bytes.

In step A1, the contents (BRP) of the address BRP of the normal RAM 93, i.e. an address indicating a point to be broken, are transferred to the change address data area 1. The "CALL" sentence requires three bytes; thus, (BRP)+1 and (BRP)+2 are transferred to the change address data areas 2 and 3.

In step A2, data is successively set in program data areas 1 to 3 in order to execute "CALL" and "communication subroutine for communication with analyzer". Specifically, an instruction code (hexadecimal code) of "CALL", an upper address of "communication subroutine for communication with analyzer", and a lower address of "communication subroutine for communication with analyzer" are set, respectively, in the program data areas 1 to 3.

Then, if the program of the camera is executed, the code of the ROM 91 is changed in a pseudo-manner when the value of the program counter PC coincides with the value of (BRP), and the "communication subroutine for communication with analyzer" is executed.

The communication between the camera and the analyzer is carried out by a method disclosed in Japanese Patent Application No. 941/90 of the present applicant. In this Patent Application, the camera and the external device are connected by serial lines, and the following operations of the camera can mainly be performed from an external device:

(1) read/write of the RAM or I/O ports in the camera, (2) independent execution of a given subroutine in the camera, (3) execution of a program at a given ROM address in the camera, and (4) mode of continuous communication between the camera and the external device.

The invention of Application 941/90 has a function of "switching the communication mode between continuous mode and non-continuous mode in accordance with a mode signal from an external device, continuously carrying out a communication subroutine for communication with the external device if a continuous mode setting signal is supplied from the external device, and restoring the communication subroutine to the main routine after execution if a continuous mode release signal is supplied from the external device." If this function is given to the camera of FIG. 11 and the analyzer of FIG. 11 is set in "continuous communication mode", the camera operates in the communication mode. That is, the operation of the camera is set in the broken state.

As stated above, by using the technique of Application 941/90, the camera operation can be broken at a given ROM address for checking.

Figure 13:
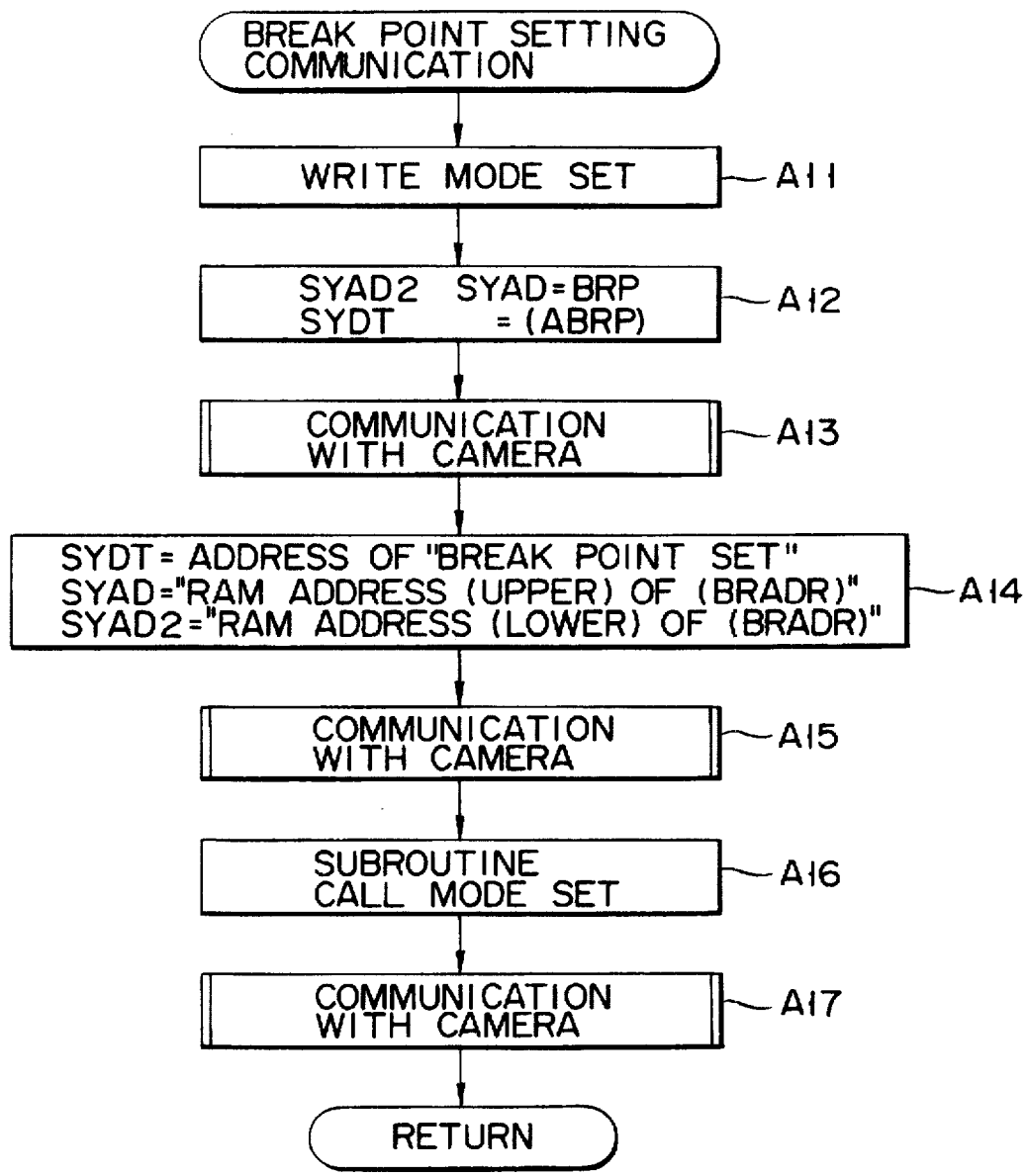
FIG. 13 is a flowchart illustrating a subroutine of "break point setting communication" for enabling the camera system of FIG. 11 to communicate with an analyzer at a given address in the camera.

FIG. 13 is a flowchart of a subroutine of "break point set communication" for effecting communication between the camera and the analyzer at a given address in the camera. In this case, the analyzer of the camera system of FIG. 11 is employed, in accordance with the invention of Application 941/90.

In steps A11 to A13 in the subroutine, the contents of the address ABRP of the RAM of the analyzer, i.e. the data of the ROM address value (break point) to be broken in the camera, are written in the address BRP of the normal RAM of the camera by the RAM write mode communication. Then, in steps A14 to A15, the address of the subroutine of "break point set" is set at the address BRADR of the normal RAM of the camera. Subsequently, in steps A16 to A17, a subroutine call mode of "break point set" is set.

If the subroutine of "break point set" of the camera is executed by the pressing of steps A14 to A17, the break point can be set in the program change RAM of the camera from the analyzer.

An example of the use of the malfunction analysis system will now be described in detail when an electrically-driven zoom is employed.

Figure 14:
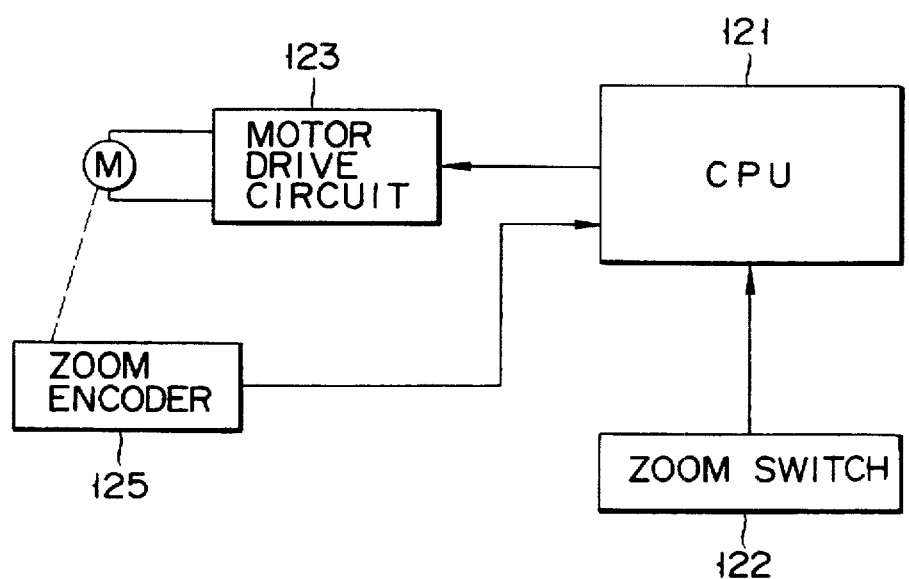
FIG. 14 is a block diagram showing a zoom system of the camera system of FIG. 11, wherein a malfunction of an electrically-driven zoom is analyzed.

Referring to FIGS. 14 and 15, a zoom system of the camera will first be described. In FIG. 14, numeral 121 denotes a CPU for performing a sequence control of the overall system and various arithmetic operations.

Numeral 122 denotes a seesaw type zoom switch for selecting the direction of zooming (T: telescopic zooming; W: wide-angle zooming). If the T-side portion is pressed, telescopic zooming is effect, and if the wside portion is pressed, wide-angle zooming is effected. Numeral 123 denotes a motor drive circuit for driving zoom motor 124. For example, the circuit 123 is constituted by a transistor bridge circuit. Numeral 125 denotes a zoom encoder for supplying to the CPU 121 focal distance information varying in accordance with zooming.

FIG. 15 shows in detail the zoom motor 124 and zoom encoder 125. The zoom encoder 125 is constituted by a circuit pattern 132 on a stationary frame 131 and a slidable contact 134 on the inner periphery of a zoom ring 133. The driving force of the zoom motor 124 is transmitted to the zoom ring 133 via gears 135 and 136. When the zoom ring 133 is rotated, zooming is effected and at the same time the slidable contact 134 slides on the circuit pattern 132. The variable focal distance information is thus supplied to the CPU (121 in FIG. 14).

An example of a zooming operation sequence is described with reference to FIG. 16. In step B1, a zoom drive subroutine is called. In step B2, a timer of the CPU is started. The routine from step B3 is a loop processing. If processing is not completed within a predetermined time (if the time set by the timer lapses), the processing is suspended by the operation of the timer. Step B3 is a subroutine for storing the zoom switch state data in the memory in the CPU, and step B4 is a subroutine wherein position data of the zoom lens is input by the zoom encoder. Steps B5, B7, B11 and B12 are branched according to the input data.

Specifically, if the T-side portion of the zoom switch is pressed and the zoom lens has not reached the telescopic-zooming end, the zoom motor is driven to effect telescopic zooming. Inversely, if the W-side portion of the zoom switch is pressed and the zoom lens has not reached the wide-angle zooming end, the zoom motor is driven to effect wide-angle zooming.

If the zoom switch is not operated or the zoom lens has reached the end, the zoom motor is stopped and the zoom drive subroutine is finished. In addition, if the timer started in step B2 is ended, the subroutine is finished after stopping the zoom motor. If the timer has not been ended, the control routine from step B3 (input of zoom switch state data) is repeated.

An example of a malfunction analysis according to the invention will now be described. In this example, it is supposed that in the above system a malfunction occurs and zooming is not effected by the zoom switch.

As has been described above, if the analyzer of this invention is employed, a program can be broken at a given point. Then, communication with the analyzer can be carried out, the subroutine executed, and the operation of the RAM and I/O ports operated. At first, the zooming operation sequence of FIG. 16 is broken at the point of step B3. While operating the zoom switch, the zoom switch state data input subroutine is executed. After execution, zoom switch state data in the RAM is read out and compared with the zoom switch state. If data is erroneous, it can be guessed that the zoom switch system has malfunctioned.

Figure 16:
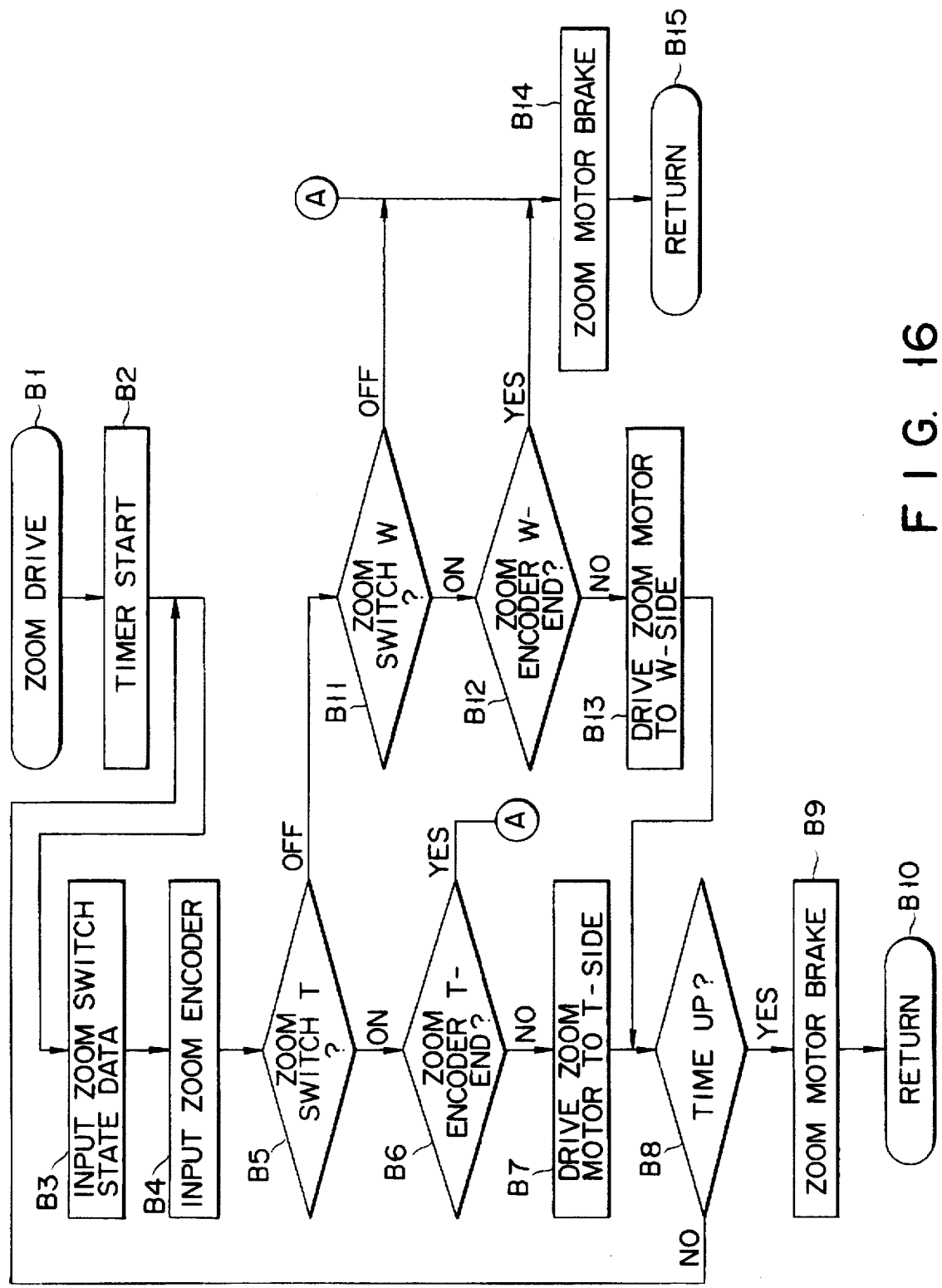
FIG. 16 illustrates a sequence of the zooming operation of the zoom system shown in FIG. 14.
Figure 17B:
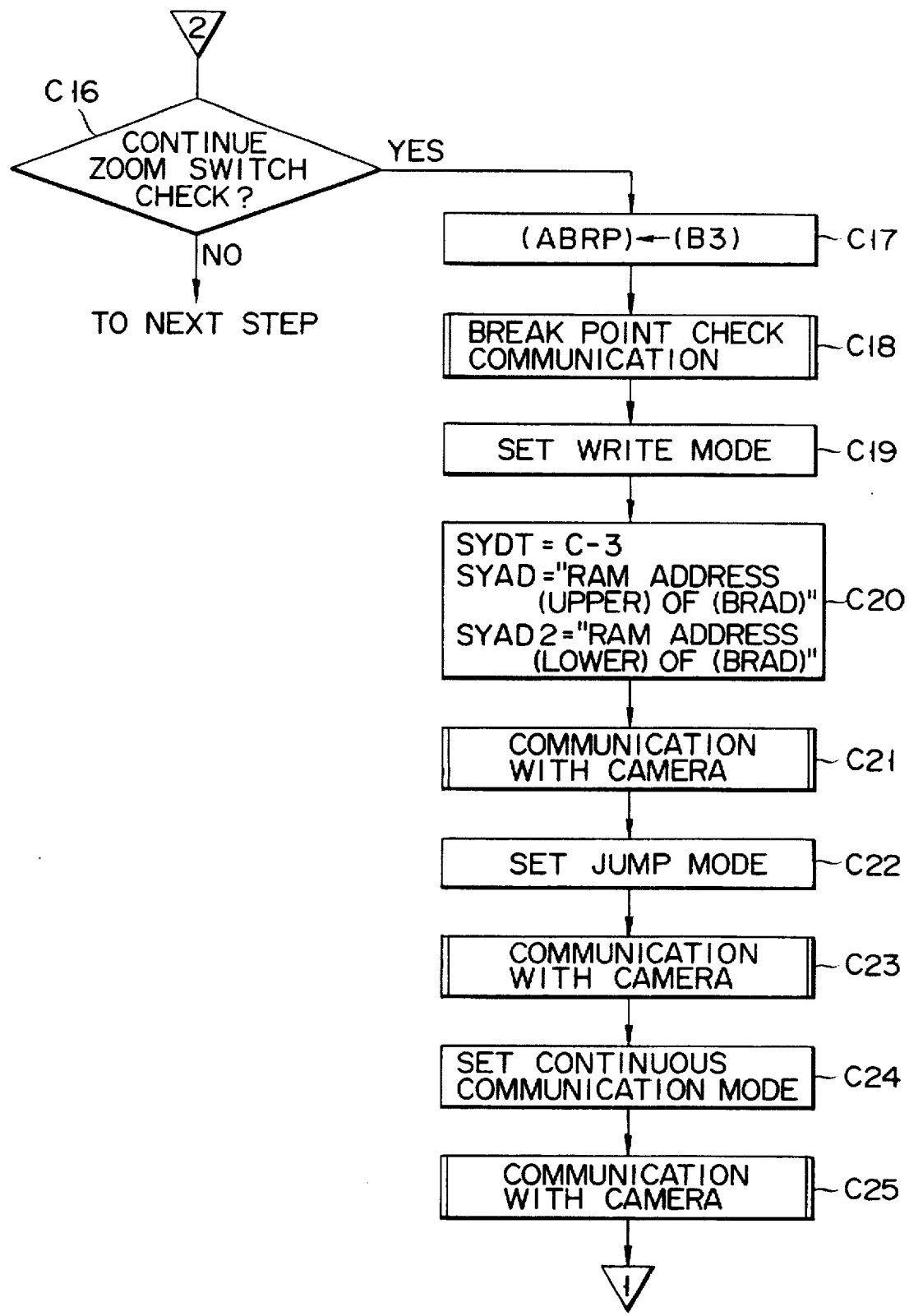

The program of the analyzer executed thus far is illustrated in the flowcharts of FIGS. 17A and 17B. In steps C1 (step 1) and C2, the continuous communication mode is set. In steps C3 and C4, the break point of the camera is set at step B3 (sequence 3 in FIG. 16, i.e. the address in the zoom switch state data input subroutine). If the routine is broken, communication starts since the subroutine of "communication mode for communication with external device" is set at the break point.

In steps C5 to C7, the break is displayed and the zoom switch operation instruction is displayed. In step C8, the continuity/discontinuity of the malfunction analysis is determined according to the switch operation of the analyzer. In steps C9 to C10, the break point of the camera is set at step B4 (sequence 4 in FIG. 16, i.e. the address in the zoom lens position data input subroutine by means of the zoom encoder). In steps C11 to C14, the zoom switch state data is read out from the RAM in the camera. In step C15, the zoom switch state is displayed and checked visually.

In step C16, the continuity/discontinuity of the zoom switch state check is determined. In the case of continuing the check, the break point of the camera is set at step B3 once again in steps C17 and C18. In steps C19 to C23, the control routine is jumped to the camera break point step B3. In the jump mode, the continuous communication mode is released. Thus, in steps C24 and C25, the routine is set in the continuous communication mode once again and returned to step S6.

Like the above-described zoom switch state check, if the zooming operation sequence of FIG. 16 is broken at the point of step B4, it can be guessed that a malfunction has occurred in the zoom encoder. If various data is set at the point of step B4, the subsequent branching of the routine can be easily traced.

If no malfunction is found in the zoom switch or zoom encoder in the above check, the break point is set at the point of step B10 in the zooming operation sequence of FIG. 16. If the break is effected, the lens is not actually driven despite the attempt to drive the zoom motor for a predetermined time. Therefore, it can be guessed that a malfunction has occurred in any one of the zoom motor, motor drive system or lens frame. If the current flowing in the motor drive system is monitored at the same time, the location of the malfunction is further specified. In the case of repair, the cause of the malfunction is specified and the time required for repair can be saved remarkably.

In this example, the method of checking the zoom unit has been described; however, other parts can be checked by the same method.

The above embodiments are directed to the camera system to be checked at a desired function or address after the camera is manufactured, and no mention is made of the correction of a bug in the CPU. A description will now be given of an embodiment of a camera system wherein a bug in a CPU after manufacture can be corrected without exchanging the CPU.

FIG. 18 shows a camera system wherein a bug in a CPU after manufacture can be corrected by use of an EEPROM built in the camera.

Only the internal elements of a camera 161, which are indispensable in this invention, are shown. A microcomputer 162 is a one-chip microcomputer having the above-described program changing functions. AF 163 is a distance measuring section, AE 164 a photometer section, and strobe 165 a strobe unit. A motor driver 166 is connected to the microcomputer 162. The motor driver 166 is connected to motors necessary for driving the camera. Specifically, LM is a lens drive motor, WM a film feed motor, SM a shutter drive motor, and ZM a zoom drive motor.

An EEPROM (electrically erasable programmable read-only memory) 167 is connected to the microcomputer 162 by a serial communication line. The microcomputer 162 is connected to switches SW: a power on/off switch PW, a release switch or two-stage switch SWR, a bottom cover open/close switch BK, a film rewind switch RW, a zoom switch ZS, and a mode change switch MD.

The camera 161 is also provided with connectors 169 and 170 for connection with an external device 168. The connectors 169 and 170 are constituted by a terminal for data communication between the camera 161 and the external device 168, and a check terminal (CHECK) for ensuring the connection between the external device 168 and the serial communication line between the microcomputer 162 and the EEPROM 167.

The check terminal 170 is set in "high-level (H) state" by an internal pull-up resistance of the microcomputer 162 when the external device is removed (normal camera use mode). When the external device 168 is connected, a "low-level (L)" signal is output from the external device and the terminal 170 is set in "L" level.

Figure 19A:
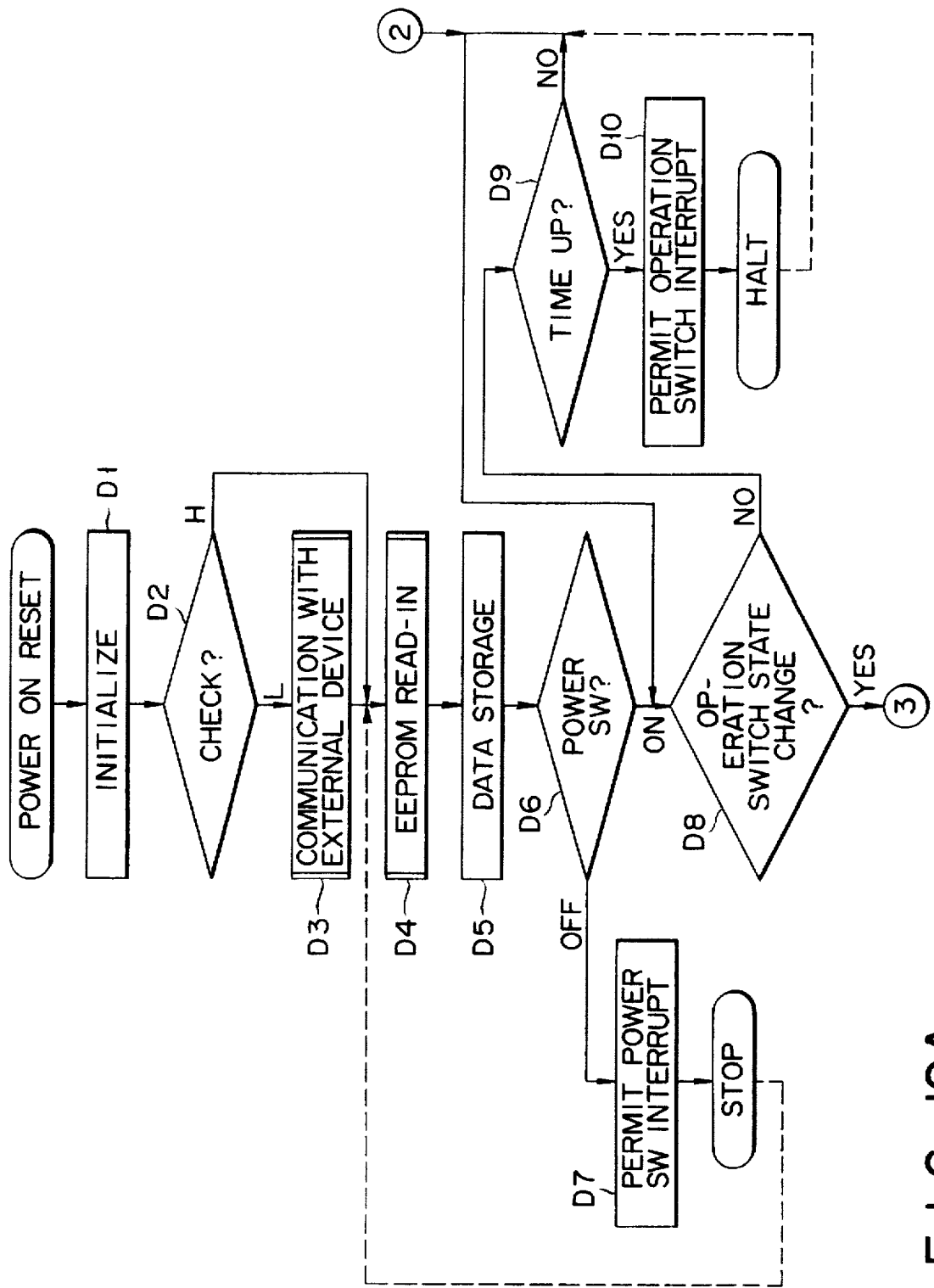
Figure 19B:
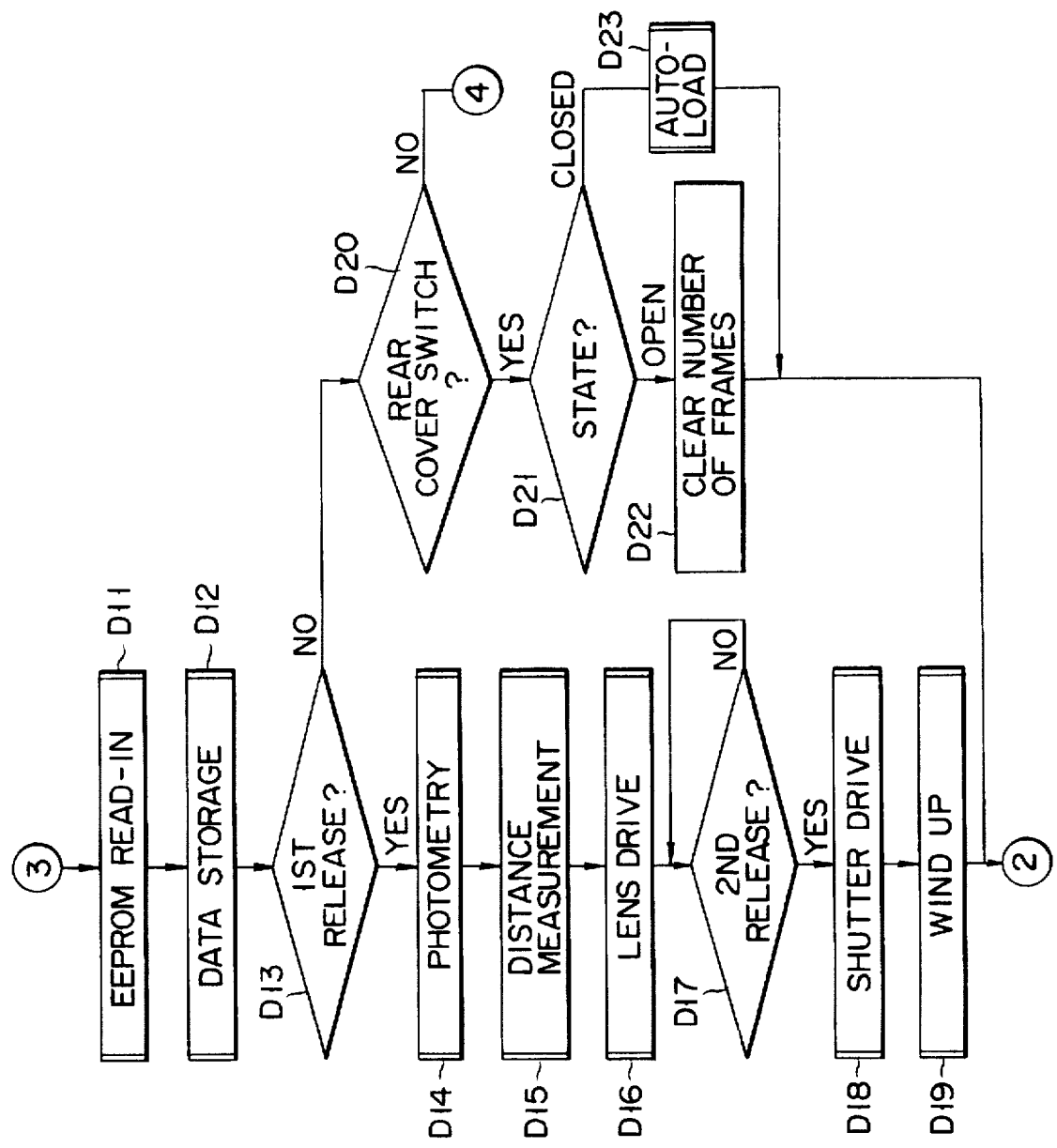

The operation of the microcomputer 162 in the camera 161 of the above embodiment will now be described with reference to the flowcharts of FIGS. 19A through 19C.

In step D1, the ports, RAM, etc., of the microcomputer 162 are initialized. In step D2, if the CHECK terminal 170 is at the "L" level, communication with the external device is effected (step D3). Since the external device 168 is not connected normally, the CHECK terminal 170 is at the "H" level and communication is no effected. The external device is connected, for example, when the camera system is adjusted in a factory or repaired in a repair station.

In this embodiment, utilizing the communication, adjustment values or program correction data is written in the EEPROM 167 by the method described below.

In step D4, the EEPROM 167 is accessed. If there is data for program change, the data is stored in the program change RAM in the microcomputer 162 in step D5. In step D6, the power switch SW of the camera 161 is checked.

If power switch SW is turned off, only the interrupt of power switch SW is permitted (step D7). In order to save power consumed in the camera 161, the oscillation of the microcomputer 162 is stopped. Then, if power switch SW is turned on, the EEPROM 167 is accessed once again and the data is stored in the microcomputer 162. This is because possible abnormality of the RAM in the microcomputer 162 due to static electricity during a long time stop must be corrected.

In step D6, if the power switch SW is turned on, the control routine advances to a normal camera operation sequence. In the normal sequence, the control stands by until the operation switch SW of the camera is changed (step D8). If the camera operation is not performed for a predetermined time period (step D9), the interrupt of the operation switch SW is permitted in step D10 and the halt mode in which only display is carried out is performed. If the operation switch is pressed in the halt mode, the operation of the microcomputer 162 is started once again.

If the operation switch SW is operated in step D8, the EEPROM is accessed in step D11 and data is stored in step D12 (this is because possible abnormality of the RAM in the microcomputer 162 must be corrected, as mentioned above).

Thereafter, if the first release is turned on in step D13, photometry, distance measurement and lens drive are effected in steps D14, D15 and D16. If the second release is turned on in step D17, shutter drive and winding is carried out in steps D18 and D19. In steps D20 to D23, the number of frames is cleared and auto-loading is performed in accordance with the state of the rear cover switch.

Further, in steps D24 to D26, the kind of each switch is determined, and, based on the determined result, camera operations such as zoom drive, rewinding and mode change are carried out in steps D27 to D29.

FIG. 20 shows an example of a memory map in the EEPROM in this embodiment. The EEPROM has a "camera state" area for maintaining the state before the removal of the battery even if the battery is removed (data relating to the number of frames, the winding operation, rewinding operation), an "adjustment values" area of the camera (AF correction values, AE correction values, etc.), and a "program change data" area for the present embodiment.

FIG. 21 is a flowchart illustrating an example of the operation of writing data in the EEPROM. This flowchart relates to a program of the external device 168 or illustrates the general idea of the operation method. The actual data communication method may be based on the method of Japanese Patent Application No. 941/90 of the present applicant. When the CHECK terminal is at the "L" level, the camera can communicate with the external device; thus, data can be written in the EEPROM according to the flowchart of FIG. 21.

In step E1, the continuous communication mode is set, so that communication between the camera 161 and external device 168 can be continuously carried out. In FIG. 21, it is supposed that an EEPROM write-in subroutine is provided in the microcomputer 162 of the camera 161. In step E2, the data to be written in the RAM in the camera 161 and the address of the EEPROM 167 at which the data is to be written are specified. In step E3, the data can be written if the EEPROM write-in subroutine is called.

Accordingly, the data to be written and the address of the EEPROM at which the data is to be written are set, and the EEPROM write-in subroutine is called. This process is repeated. If the data write is not finished in step E4, the data to be written and the address of the EEPROM 167 at which the data is to be written are designated and the control routine returns to step E3. If the data write is finished in step E4, the continuous communication mode is released in step E6 and the camera is restored in the normal mode.

FIG. 22 is a flowchart illustrating another example of the operation for writing data in the EEPROM 167. FIG. 22 differs from FIG. 21 in that data is directly written from the external device 168 into the EEPROM 167.

In step F1, the CHECK terminal 170 is set at the "L" level and the continuous communication mode is set. In step P2, a subroutine for setting a communication line (port of microcomputer 162) in the camera 161 at a high impedance or input is called. Thereby, signals of the microcomputer 162 and the external device 168 do not collide. Thus, in step F3, data can freely be written from the external device 168 into the EEPROM 167 of the camera.

In this case, however, the camera cannot communicate once again. Thus, in order to restore the camera into the normal state after the operation is completed, it is necessary to operate the power switch of the camera or remove the battery.

Figure 23A:
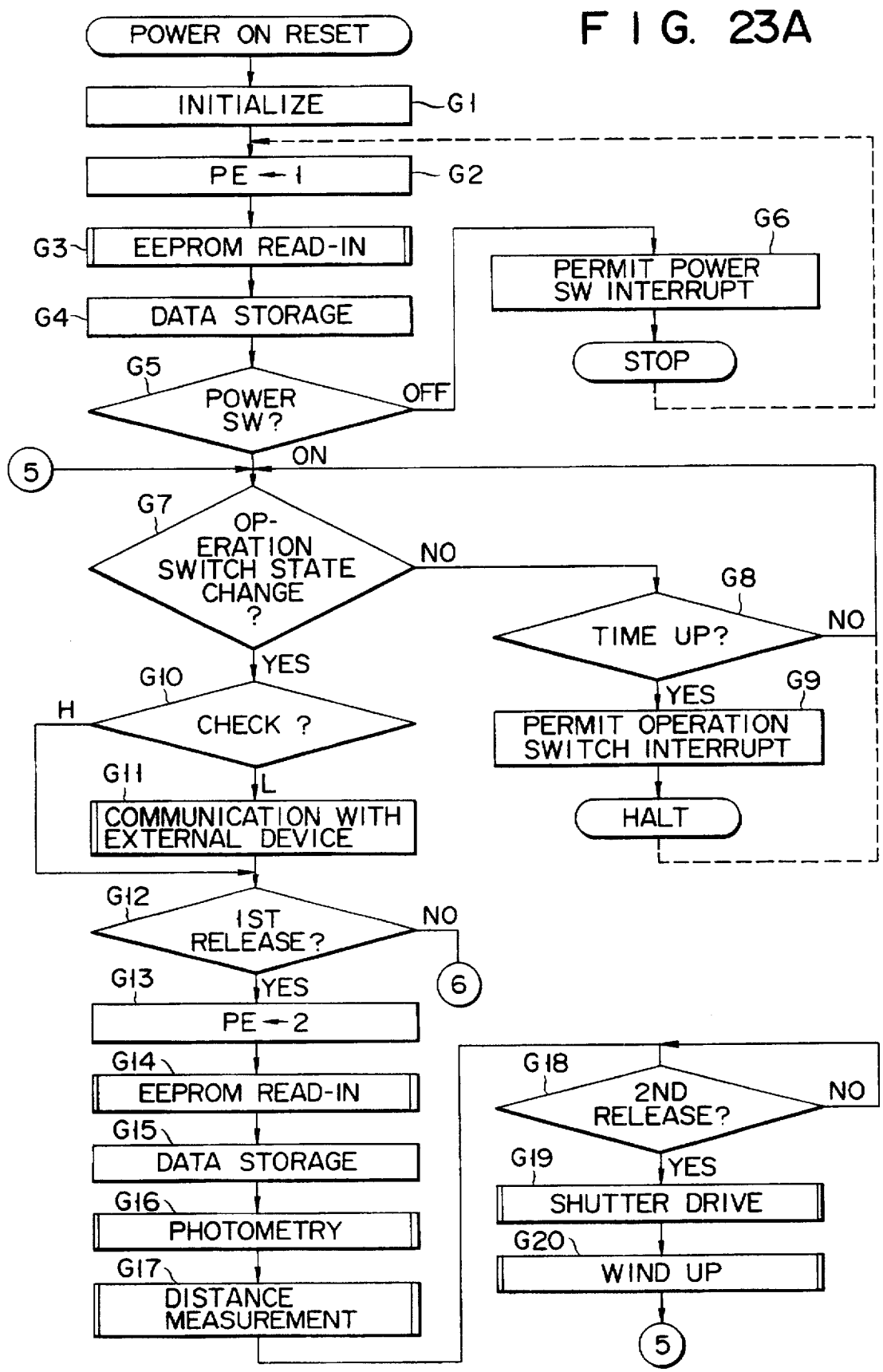
FIGS. 23A and 23B show other examples of the flowchart illustrating the operation of the microcomputer in the camera system of FIG. 18.
Figure 23B:
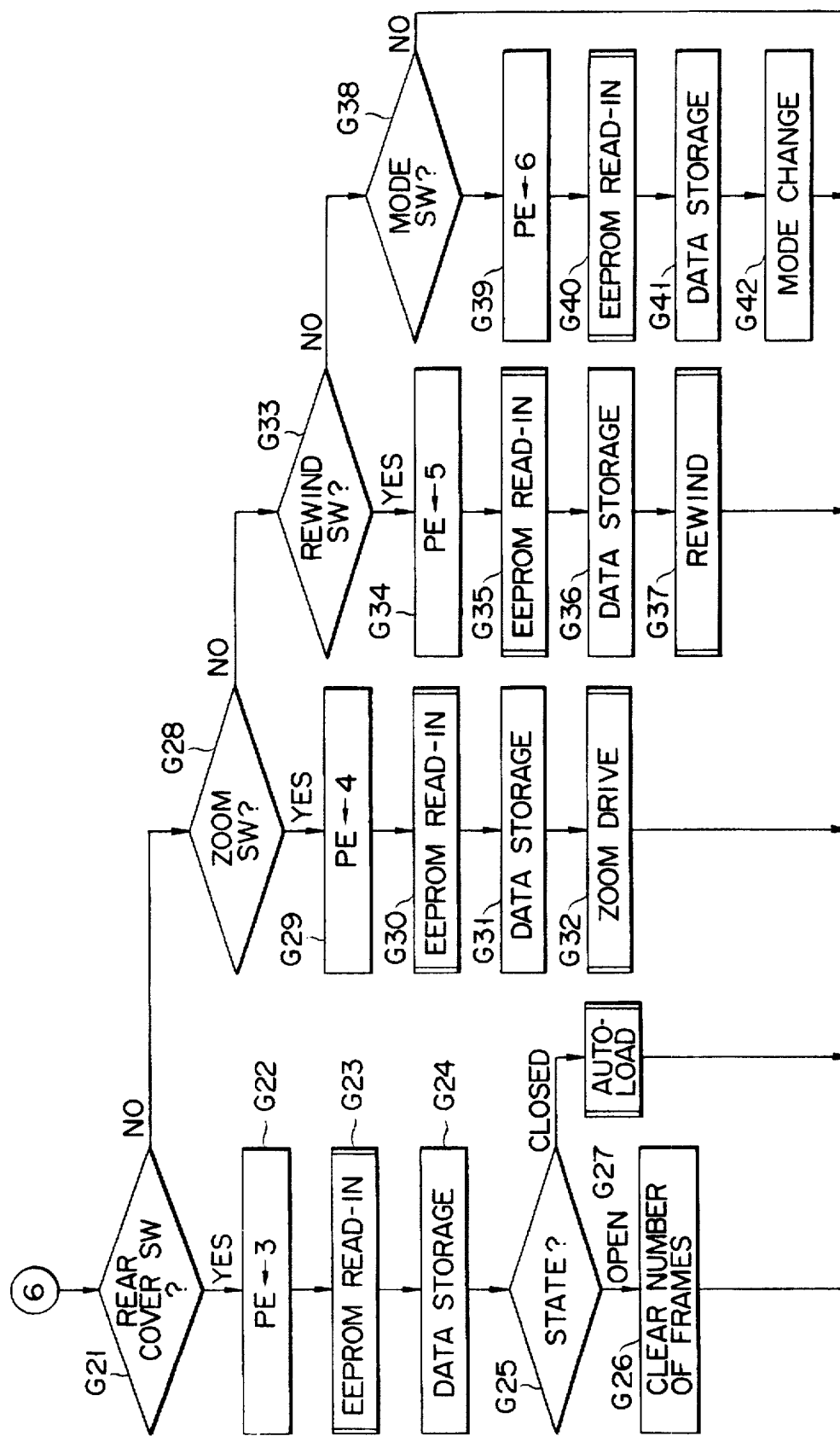

FIGS. 23A and 23B are other examples of the flowcharts illustrating the operation of the microcomputer 162 in the camera 161. These figures differ from FIGS. 19A and 19B in that the timing of communication with the external device is changed from the time point just after the power on reset (step D2, D3) to the time point after the operation of the operation switch (step G10, G11), and in that the contents of the program change data are selected according to the state of the camera. In the other respects, the flowcharts of FIGS. 23A and 23B are identical to those of FIGS. 19A and 19B, and a description thereof is omitted.

Specifically, the timing of communication with the external device may be at the time point after the power on reset or the time point after the operation of the change of state of the operation switch SW.

Figure 24:
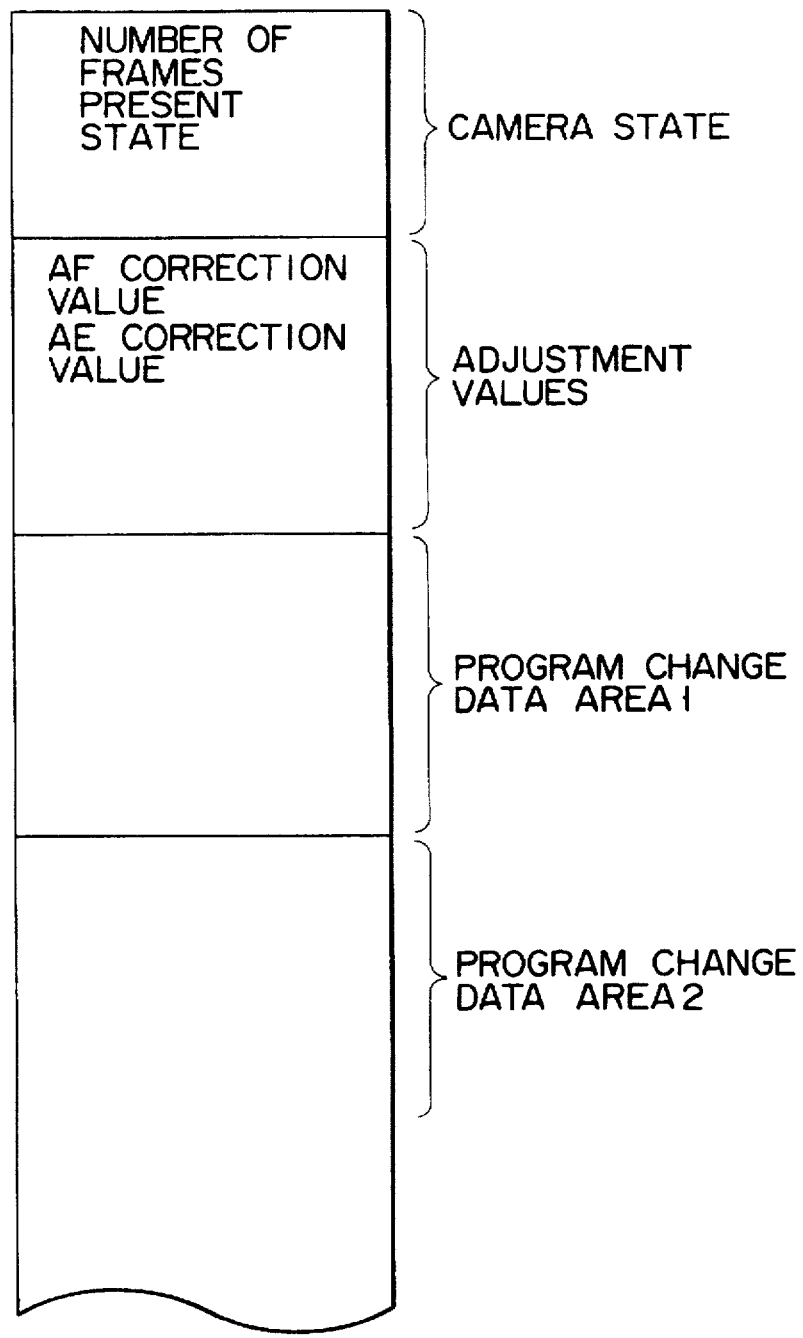
FIG. 24 shows another example of a memory map in the EEPROM in the camera system of FIG. 18.

The read in of data in the EEPROM is effected by changing the address of the EEPROM at which the data is read in accordance with the value of a variable PE (steps G21 to G42). When PE=1, the data in "program change data area 1" shown in FIG. 24 is read in; when PE=2, the data in "program change data area 2" is read in.

As is shown in the flowcharts, different areas of the EEPROM can be read out at time points after power on reset, after the first release, after the opening/closing of the rear cover, and at the time of zoom operation. Accordingly, the contents of the program change RAM are changed by operations; thus, even if the capacity of the program change RAM in the microcomputer is small, the program may be change at various points.

Thus, if the number of bugs in the CPU increases to some extent, the bugs can be corrected.

FIG. 25 shows an example of a camera system wherein a camera is connected to a write device for writing program change data in an EEPROM in the camera, when a bug is actually present in the program. As is shown in FIG. 25, an external device 168' has an LCD display 171, a power on switch PWSW, an operation switch 172, an IC card mount unit 173, etc. A bug correction program in the external device 168' is stored in an IC card 174 which can be mounted in the IC card mount unit 173. The IC card 174 is prepared for each type of camera 161. By changing the IC card, the external device can be used commonly for various camera systems.

When the outer casing of the camera 161 is partly removed, it can be seen that connection terminals 169 and 170 with the external device 168 are provided. The connection terminals 169 and 170 and the external device 168' are connected, for example, by a connection cable 175.

An example of bug correction will now be described. In this example, the camera system having the structure of FIG. 18 is employed, and a CHECK terminal port of the microcomputer can receive an interrupt signal. The program in the camera 161 is that illustrated by the flowcharts of FIGS. 19A and 19B, from which steps D2 and D3 are omitted and to which the interrupt program shown in FIG. 26 is added.

When an "H" level signal falls to an "L" level signal at the CHECK terminal 170, an interrupt signal is generated. When an interrupt is generated (step D'1), the camera 161 executes a communication program for communication between the camera 161 and the external device 168 (step D'2).

Since communication with the external device 168 can be carried out by the interrupt, the external device 168 can freely output an instruction to the camera 161.

Figure 27B:
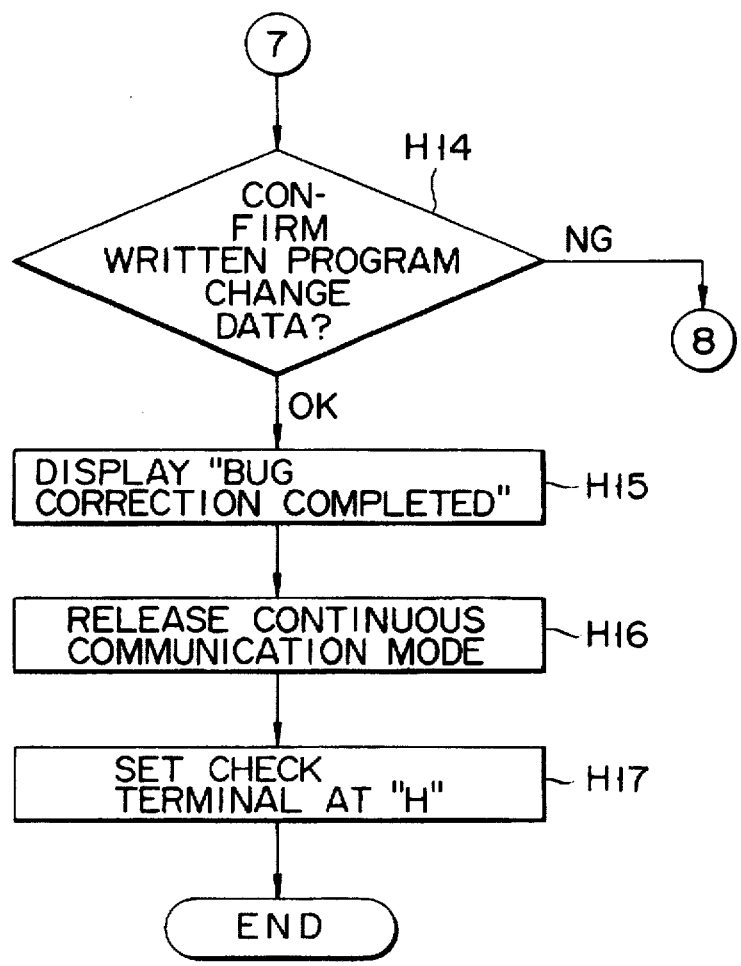

FIGS. 27A and 27B are flowcharts illustrating an example of writing program change data only by an instruction from an external device, without camera operations. FIGS. 27A and 27B are general flowcharts relating to the external device, and the actual program is based on Japanese Patent Application No. 941/90.

The external device 168 is connected to the camera 161, and the power switch PWSW of the external device 168 is turned on. The control routine of the flowcharts of FIGS. 27A and 27B is started. Needless to say, the program may be started after the power switch PWSW is turned on, and after the operation switch 172 is pressed.

The message "bug is corrected" is displayed on an LCD display 171 (step H1), and it is checked if the communication with the camera 161 can be normally performed. Specifically, when the CHECK terminal 170 is set at the "L" level (step H2), an interrupt is effected and a communication signal is generated (steps H3 and H4), and this is checked (step H5). If the connection of the connection cable 175 is bad, the communication signal is not output, and the message "communication is not good" is displayed (step H6). After a predetermined time has passed (step H7), the CHECK terminal 170 is set at the "L" level once again and the communication is checked.

In step H5, when communication is carried out with no problem, a communication request is issued once again (CHECK terminal 170 is at "L") (step H8), and the continuous communication mode is set (step F9).

Then, the camera type code, ROM version, etc., stored in the CPU of the camera 161 are read (step H10), and it is checked if the IC card matches the present camera (step H11). If the mounted IC card does not match the camera 161 or ROM version, the message "IC card does not match the camera" is displayed on the LCD display 171 (step H12), and the program is finished.

In step H11, when the IC card matches the camera, program change data for bug correction is written in the EEPROM 167 in the camera 161 (step H13).

Then, the contents of the EEPROM 167 are read and the program change data is confirmed (step H14). In step H14, if the program change data is correctly written, the message "bug correction finished" is displayed on the LCD display 172 (step H15), and the continuous communication mode is released (step H16). The CHECK terminal 170 is restored to the "H" level (step H17) and the program is completed.

If the program change data is not correctly written in step H14, the control returns to step H13 and the data is written once again.

As has been described above, according to the present invention, there can be provided a general-purpose camera system capable of operating in the optimal state without losing new functions, and without need to re-design the program of the camera.

In addition, since there is no need to set an analysis program in the camera, analysis can be carried out without increasing the program capacity in the camera.

Furthermore, since break check can be carried out at a given address of the program stored in the camera, any function of the finished camera system can be checked by a program in an external device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera system comprising:

a microcomputer provided in a camera body, said microcomputer including a read-only memory for storing a series of program instructions for operating the camera, a program counter for designating addresses of the program instructions stored in the read-only memory, a replacement program memory for storing a change address and a replacement program instruction of a portion to be corrected in said series of program instructions, said replacement program instruction being read out instead of a program instruction stored in the read-only memory only when the change address coincides with a program instruction address designated by the program counter, and an instruction decoder for controlling a camera element via an interface circuit according to the program instruction read out from the read-only memory or the replacement program instruction read out instead of the program instruction; and a camera accessory connectable to said camera body, said camera accessory including memory means for storing a change address and a replacement program instruction for making a necessary correction in order to use said series of program instructions stored in the read-only memory in combination with the camera accessory, and transmission means for transmitting the change address and the replacement program instruction stored in said memory means to the camera body; and write control means, provided in the camera body, for receiving the change address and the replacement program instruction transmitted by the transmission means and writing the same into the replacement program memory.

2. A system according to claim 1, wherein said write control means executes a write operation in accordance with a power on reset of the microcomputer in the camera body.

3. A system according to claim 1, wherein said write control means executes a write operation in accordance with a display re-start operation by said microcomputer in the camera body.

4. A system according to claim 1, wherein said write control means executes a write operation in accordance with a data transfer request signal from said camera accessory.

5. A system according to claim 1, wherein said camera accessory is a strobe device including memory means for storing a change address and a replacement program instruction for changing a light emission timing, stored in the read-only memory in the camera body, of the strobe device.

6. A system according to claim 1, wherein said camera accessory is a lens-barrel including memory means for storing a change address and a replacement program instruction for changing a focusing operation of the lens-barrel from a camera body side to an operation of transmitting defocusing amount data to the lens barrel.

7. An analyzing system, coupled to a camera body, for stopping continuous operation of the camera at a given step, thereby analyzing the operation of the camera, said analyzing system comprising:

a microcomputer provided in the camera body, said microcomputer including a read-only memory for storing a series of program instructions for operating the camera, a program counter for designating addresses of the program instructions stored in the read-only memory, a replacement program memory for storing a change address of a portion of said series of program instructions at which the continuous operation of the camera is to be stopped, and for storing a replacement program instruction for effecting the stopping operation, said replacement program instruction being read out instead of a program instruction stored in the read-only memory only when the change address coincides with a program instruction address designated by the program counter, and an instruction decoder for controlling a camera element via an interface circuit according to the program instruction read out from the read-only memory or the replacement program instruction read out instead of the program instruction; and an analyzer connectable to said camera body, said analyzer including memory means for storing a change address of a step in said series of program instructions stored in the read-only memory at which processing is stopped, and for storing a replacement program instruction for stopping the processing, and transmission means for transmitting the change address and the replacement program instruction stored in said memory means to the camera body; and write control means, provided in the camera body, for receiving the change address and the replacement program instruction transmitted by the transmission means and writing the same into the replacement program memory;

wherein said microcomputer of the camera body temporarily stops the operation of the camera when the change address coincides with a program instruction address designated by the program counter.

8. A system according to claim 7, wherein said analyzer includes a replacement program instruction for effecting communication between the camera body and the analyzer after the operation of the camera is temporarily stopped.

9. A camera system comprising:

a microcomputer provided in a camera body, said microcomputer including a read-only memory for storing a series of program instructions for operating the camera, a program counter for designating addresses of the program instructions stored in the read-only memory, a replacement program memory for storing a change address and a replacement program instruction of a portion to be corrected in said series of program instructions, said replacement program instruction being read out instead of the program instruction stored in the read-only memory only when the change address coincides with a program instruction address designated by the program counter, and an instruction decoder for controlling a camera element via an interface circuit according to the program instruction read out from the read-only memory or the replacement program instruction read out instead of the program instruction; and an external device connectable to said camera body, for correcting a step of a portion of said series of program instructions stored in the read-only memory, said external device including memory means for storing a change address of a step requiring correction in said series of program instructions and for storing a replacement program instruction, and transmission means for transmitting the change address and the replacement program instruction stored in said memory means to the camera body;

a non-volatile memory, provided in said camera body, for receiving the change address and the replacement program instruction transmitted by the transmission means while the external device is connected to the camera body, said change address and the replacement program instruction being written in the non-volatile memory and being stored even after the external device is disconnected from the camera body; and write control means for writing the change address and the replacement program instruction stored in the non-volatile memory into the replacement program memory.

10. A system according to claim 9, wherein said write control means executes a write control in accordance with the operation of an operation member of the camera body.

11. A system according to claim 9, wherein said write control means executes a write control in accordance with a power on reset in the camera body.

12. A system according to claim 9, wherein said write control means executes a write control in accordance with a communication request interrupt from the external device.

13. A system according to claim 9, wherein said external device includes display means for displaying a communication state between the external device and the camera body.

14. A system according to claim 9, wherein said external device includes display means for displaying a message indicating that the write control means has completed writing of data into the non-volatile memory in the camera body.

15. A camera comprising:

a microcomputer provided in a camera body, said microcomputer including a read-only memory for storing a series of program instructions for operating the camera, a program counter for designating addresses of the program instructions stored in the read-only memory, a replacement program memory for storing a change address and a replacement program instruction of a portion to be corrected in said series of program instructions, said replacement program instruction being read out instead of the program instruction stored in the read-only memory only when the change address coincides with a program instruction address designated by the program counter, and an instruction decoder for controlling a camera element via an interface circuit according to the program instruction read out from the read-only memory or the replacement program instruction read out instead of the program instruction;

a non-volatile memory, provided in said camera body, for receiving a transmitted change address and replacement program instruction while an external device, which has a memory means for storing a replacement program and a change address of a step requiring correction in said series of program instructions, is connected to the camera body, said change address and the replacement program instruction being written in the non-volatile memory and being stored even after the external device is disconnected from the camera body; and write control means for writing the change address and the replacement program instruction stored in the non-volatile memory into the replacement program memory.

16. A camera according to claim 15, wherein said write control means executes a write control in accordance with the operation of an operation member of the camera body.

17. A camera according to claim 15, wherein said write control means executes a write control in accordance with a power on reset in the camera body.

18. A camera according to claim 15, wherein said write control means executes a write control in accordance with a communication request interrupt from the external device.

19. A camera system comprising:

a microcomputer provided in a camera body, said microcomputer including a read only memory for storing a series of program instructions for operating said camera, and pseudo-rewrite means for rewriting a portion to be corrected in said series of program instructions in a pseudo-manner;

memory means, connectable to the camera body, for storing a change address of a step requiring correction in the series of program instructions stored in the read-only memory and for storing a replacement program instruction;

a transmission device for transmitting the change address and the replacement program instruction stored in the memory means to the camera body;

a non-volatile memory, provided in said camera body, for receiving the transmitted change address and the replacement program instruction while an external device is connected to the camera body, said change address and the replacement program instruction being written in the non-volatile memory and being stored even after the external device is disconnected from the camera body; and write control means for writing the change address and the replacement program instruction stored in the non-volatile memory into a replacement program memory in said pseudo-rewrite means.

20. A system according to claim 19, wherein said non-volatile memory has an adjustment value storage area.

21. A system according to claim 19, wherein said non-volatile memory has an area for storing a present state of the camera body, and a change data area for storing the change address and the replacement program instruction.

22. A camera comprising:

a microcomputer provided in a camera body, said microcomputer including a read only memory for storing a series of program instructions for operating said camera, and pseudo-rewrite means for rewriting an arbitrary step to be corrected in said series of program instructions in a pseudo-manner;

a non-volatile memory, provided in the camera body, in which pseudo-rewrite data in the read-only memory is written by an external device, connectable to the camera, for transmitting the pseudo-rewrite data, the written pseudo-rewrite data being stored even after the external device is disconnected from the camera body; and write control means for writing the pseudo-rewrite data stored in the non-volatile memory into a replacement program memory in said pseudo-rewrite means, for storing adjustment values for adjusting mechanical or electrical variation of the camera body, and a change data area for storing the change address and the replacement program instruction.

23. A system according to claim 22, wherein said non-volatile memory has an adjustment value storage area for storing adjustment values for adjusting mechanical or electrical variation of the camera body, and a change data area for storing the pseudo-rewrite data.

24. A system according to claim 22, wherein said non-volatile memory has an area for storing a present state of the camera body, and a change data area for storing the pseudo-rewrite data.

25. A camera system comprising:

a microcomputer provided in a camera body, said microcomputer including a read only memory for storing a series of program instructions for operating said camera, and pseudo-rewrite means for rewriting an arbitrary step to be corrected in said series of program instructions in a pseudo-manner;

a camera accessory connectable to the camera body, the camera accessory including memory means for storing pseudo-rewrite data of a step requiring correction for using the series of program instructions stored in the read-only memory in combination with the camera accessory, and transmission means for transmitting the pseudo-rewrite data stored in the memory means to the camera body; and write control means, provided in the camera body, for receiving the pseudo-rewrite data transmitted by the transmission device and writing the pseudo-rewrite data into a replacement program memory.

26. A system according to claim 25, wherein said write control means executes a write operation in accordance with a power on reset of the microcomputer in the camera body.

27. A system according to claim 25, wherein said write control means executes a write operation in accordance with a display re-start operation by said microcomputer in the camera body.

28. A system according to claim 25, wherein said write control means executes a write operation in accordance with a data transfer request signal from said camera accessory.

29. An analyzing system, connected to a camera body, for stopping continuous operation of the camera at a given step, thereby analyzing the operation of the camera, comprising:

a microcomputer provided in a camera body, said microcomputer including a read only memory for storing a series of program instructions for operating said camera, and pseudo-rewrite means for rewriting an arbitrary step to be corrected in said series of program instructions in a pseudo-manner;

an analyzer, connectable to the camera body, the analyzer including memory means for storing pseudo-rewrite data for stopping a step to be temporarily stopped in the series of program instructions stored in the read-only memory, and transmission means for transmitting the pseudo-rewrite data stored in the memory means to the camera body; and write control means, provided in the camera body, for receiving the pseudo-rewrite data transmitted from the transmission means and writing the same into a replacement program memory in the pseudo-rewrite means;

wherein said microcomputer of the camera body temporarily stops the operation of the camera in accordance with the pseudo-rewrite data.

30. A system according to claim 29, wherein said analyzer includes a replacement program instruction for effecting communication between the camera body and the analyzer after the processing of the camera body is temporarily stopped.

31. A camera system for controlling various camera elements, comprising:

a microcomputer including a program counter, a read-only memory for storing a program, an instruction decoder for outputting a decoded value, and an electrically programmable replacement program memory for storing change address data and replacement program data, said replacement program data in the replacement program memory being output to the instruction decoder when a value of the program counter coincides with the change address data of the replacement program memory, and said program data stored in the read-only memory only being output to the instruction decoder when the value of the program counter does not coincide with the change address data of the replacement program memory;

an interface circuit for outputting a control signal to the camera element in accordance with the decoded value output from the instruction decoder;

memory means, provided outside the microcomputer, for storing at least the change address data and the replacement program data to be stored in the replacement program memory in the microcomputer;

transfer instruction output means for instructing transfer of the replacement data to the memory means; and write means for receiving the data transferred from the memory means and writing the data into the replacement program memory.

32. A system according to claim 31, wherein said transfer instruction output means outputs the transfer instruction when the microcomputer is reset.

33. A system according to claim 31, wherein said transfer instruction output means outputs the transfer instruction when the microcomputer is released from a low power consumption mode.

34. A system according to claim 31, wherein said transfer instruction output means outputs the transfer instruction when an operation member connected to the microcomputer is operated.

35. A system according to claim 31, wherein said memory means is provided in a camera accessory connectable to the camera system, and said transfer instruction output means outputs the transfer instruction when the camera accessory is disconnected from the camera body.

36. A system according to claim 31, wherein said memory means is connected to a camera in the camera system and arranged in an analyzer for stopping a program of the microcomputer at a given address.

37. A system according to claim 31, wherein said memory means is an electrically program unable read-only memory for storing the replacement program data, data relating to a state of the camera system, and adjustment values.

38. A camera system comprising:

a microcomputer including a program counter, a read-only memory for storing a program, a random-access memory, an instruction decoder for outputting a decoded value, and an electrically programmable replacement program memory for storing change address data and replacement program data, said replacement program data in the replacement program memory being output to the instruction decoder when a value of the program counter coincides with the change address data of the replacement program memory, and the program data stored in the read-only memory being output to the instruction decoder only when the value of the program counter does not coincide with the change address data of the replacement program memory;

an interface circuit for outputting a control signal to elements of said camera system in accordance with the decoded value output from the instruction decoder;

an electrically programmable read-only memory, provided outside the microcomputer, for storing data relating to a state of the camera system adjustment values, the change address data, and the replacement program data;

transfer instruction output means for instructing transfer of the stored data to the electrically programmable read-only memory; and write control means for receiving the stored data transferred from the electrically programmable read-only memory, writing said data relating to the state of the camera system and said adjustment values into the random access memory in the microcomputer, and writing the change address data and the replacement program data into the replacement program memory.

39. A system according to claim 38, wherein said microcomputer, said interface circuit, said transfer instruction output means and said write control means are included in a one-chip microcomputer comprising one chip.

40. A system according to claim 38, wherein said transfer instruction output means outputs the transfer instruction when the microcomputer is reset.

41. A system according to claim 38, wherein said transfer instruction output means outputs the transfer instruction when the microcomputer is released from a low power consumption mode.

42. A system according to claim 38, wherein said transfer instruction output means outputs the transfer instruction when an operation member connected to the microcomputer is operated.

43. A system according to claim 38, wherein said write control means writes a predetermined number of data of the received stored data into the random-access memory, and writes remaining data into the replacement program memory.

44. A camera system having a camera body and an external device connectable to the camera body, wherein said camera body comprises:

a microcomputer having a program counter, a read-only memory for storing a program, and a replacement program memory for storing a change address data and replacement program data for replacement in said read-only memory, a replacement program based on the replacement program data being executed instead of the program stored in the read-only memory only when a value of the program counter coincides with the change address data; and a camera control unit for controlling camera elements according to instructions from the microcomputer, a data communication program for data communication with the external device being stored in part of the read-only memory, and said external device comprises:

a memory section for storing said change address data and replacement program data; and a data transfer section for transferring the replacement program data stored in the memory section, said address data being address data for stopping execution of the program of the microcomputer, and said replacement program data being an instruction for executing the data communication program in the read-only memory.

45. A system according to claim 44, wherein said external device has a plurality of said replacement address data, and said data transfer section transfers the replacement address data successively.

46. A camera system having a camera body and an external device connectable to the camera body, wherein said camera body comprises:

a microcomputer having a program counter, a read-only memory for storing a program, and a replacement program memory for storing a change address data and replacement program data for replacement in said read-only memory, a replacement program based on the replacement program data being executed instead of the program stored in the read-only memory only when a value of the program counter coincides with the change address data; and a camera control unit for controlling camera elements according to instructions from the microcomputer, and said external device comprises:

a memory section for storing said change address data and replacement program data; and a data transfer section for transferring the replacement program data stored in the memory section.

47. A system according to claim 46, wherein said external device is a camera accessory connectable to the camera body.

48. A system according to claim 46, wherein said external device is an analyzer, connected to the camera body, for stopping the program of the microcomputer at a given address.

49. A camera comprising:

a microcomputer having a program counter, a read-only memory for storing a program, and a replacement program memory for storing a change address data and replacement program data for replacement in said read-only memory, a replacement program based on the replacement program data being executed instead of the program stored in the read-only memory only when a value of the program counter coincides with the change address data;

a camera control section for controlling camera elements according to instructions from the microcomputer;

memory means, provided outside the microcomputer, for storing the change address data and the replacement program data to be stored in the replacement program memory;

transfer instruction output means for instructing transfer of the replacement data stored in the memory means; and write control means for receiving the replacement data transferred from the memory means and writing the same into the replacement program memory, wherein said memory means has a plurality of memory areas corresponding to program steps of the microcomputer, and said transfer instruction output means outputs a transfer instruction in the course of the program of the microcomputer, for selecting one of the memory areas of the memory means corresponding to the program steps and effecting data transfer.

* * * * *